United States Patent
Gilbert et al.

(10) Patent No.: US 10,967,624 B2
(45) Date of Patent: Apr. 6, 2021

(54) FASTENING ARTICLES AND METHODS OF MAKING THE SAME

(71) Applicant: 3M INNOVATIVE PROPERTIES COMPANY, St. Paul, MN (US)

(72) Inventors: Thomas J. Gilbert, St. Paul, MN (US); Todd L. Nelson, Eau Claire, WI (US); Neelakandan Chandrasekaran, Shoreview, MN (US); Steven J. Perron, St. Paul, MN (US); Timothy P. Pariseau, Forest Lake, MN (US); Mark A. Peltier, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 83 days.

(21) Appl. No.: 16/064,085

(22) PCT Filed: Dec. 19, 2016

(86) PCT No.: PCT/US2016/067609
§ 371 (c)(1),
(2) Date: Jun. 20, 2018

(87) PCT Pub. No.: WO2017/112604
PCT Pub. Date: Jun. 29, 2017

(65) Prior Publication Data
US 2018/0368535 A1    Dec. 27, 2018

Related U.S. Application Data

(60) Provisional application No. 62/270,407, filed on Dec. 21, 2015, provisional application No. 62/270,381, filed on Dec. 21, 2015.

(51) Int. Cl.
*B32B 3/26* (2006.01)
*B32B 38/00* (2006.01)
(Continued)

(52) U.S. Cl.
CPC ...... *B32B 38/0012* (2013.01); *A44B 18/0003* (2013.01); *A44B 18/0049* (2013.01);
(Continued)

(58) Field of Classification Search
CPC ....... B32B 38/0012; B32B 3/06; B32B 27/32; B32B 37/144; A44B 18/0003; A44B 18/0049; A44B 18/0061; B29C 55/08
See application file for complete search history.

(56) References Cited

U.S. PATENT DOCUMENTS

| 3,849,949 A | 11/1974 | Steinhauser |
| 4,454,183 A | 6/1984 | Wollman |

(Continued)

FOREIGN PATENT DOCUMENTS

| EP | 0341993 | 11/1989 |
| EP | 0539504 | 5/1993 |

(Continued)

OTHER PUBLICATIONS

US 5,389,416 A, 02/1995, Mody (withdrawn)
(Continued)

*Primary Examiner* — Jason W San
(74) *Attorney, Agent, or Firm* — Kathleen B. Gross

(57) ABSTRACT

The article includes a thermoplastic layer having opposing first and second side edges and a first surface bearing male fastening elements. The thermoplastic layer is plastically deformed and has a retardance profile having an average retardance along a line from the first edge to a location 500 micrometers from the first edge and a distance from the first edge where 75% of the average retardance is observed of at least 10 micrometers. In some cases, a distance between the first and second side edges is up to 50 millimeters. In some cases, the article is a fastening tab. The method includes providing a thermoplastic film having opposing first and
(Continued)

second side edges, with a distance between the opposing side edges of up to 50 millimeters, and stretching the thermoplastic film to form the thermoplastic layer, which is plastically deformed. The first surface of the thermoplastic film bears male fastening elements.

20 Claims, 7 Drawing Sheets

(51) Int. Cl.
  *B32B 37/14*   (2006.01)
  *A44B 18/00*   (2006.01)
  *B29C 55/08*   (2006.01)
  *B32B 3/06*   (2006.01)
  *B32B 27/32*   (2006.01)

(52) U.S. Cl.
  CPC .......... *A44B 18/0061* (2013.01); *B29C 55/08* (2013.01); *B32B 3/06* (2013.01); *B32B 27/32* (2013.01); *B32B 37/144* (2013.01); *B32B 2038/0028* (2013.01); *B32B 2274/00* (2013.01); *B32B 2307/546* (2013.01); *B32B 2323/10* (2013.01); *B32B 2555/02* (2013.01)

(56) References Cited

U.S. PATENT DOCUMENTS

| | | |
|---|---|---|
| 4,775,310 A | 10/1988 | Fischer |
| 4,839,131 A | 6/1989 | Cloeren |
| 4,894,060 A | 1/1990 | Nestegard |
| 5,077,870 A | 1/1992 | Melbye |
| 5,260,015 A | 11/1993 | Kennedy |
| 5,284,540 A | 8/1994 | Ross |
| 5,537,723 A | 7/1996 | Yoshida |
| 5,639,327 A | 6/1997 | Mody |
| 5,691,034 A | 11/1997 | Krueger |
| 5,785,784 A | 7/1998 | Chesley |
| 5,845,375 A | 12/1998 | Miller |
| 6,075,179 A | 6/2000 | McCormack |
| 6,106,922 A | 8/2000 | Cejka |
| 6,132,660 A | 10/2000 | Kampfer |
| 6,163,939 A | 12/2000 | Lacey |
| 6,190,594 B1 | 2/2001 | Gorman |
| 6,190,758 B1 | 2/2001 | Stopper |
| 6,287,665 B1 | 9/2001 | Hammer |
| 6,475,600 B1 | 11/2002 | Morman |
| 6,484,371 B1 | 11/2002 | Romanko |
| 6,546,604 B2 | 4/2003 | Galkiewicz |
| 6,582,642 B1 | 6/2003 | Buzzell |
| 6,627,133 B1 | 9/2003 | Tuma |
| 6,684,464 B1 | 2/2004 | Mody |
| 6,767,492 B2 | 7/2004 | Norquist |
| 7,014,906 B2 | 3/2006 | Tuman |
| 7,048,984 B2 | 5/2006 | Seth |
| 7,067,185 B2 | 6/2006 | Ausen |
| 7,168,139 B2 | 1/2007 | Seth |
| 7,182,992 B2 | 2/2007 | Ausen |
| 7,185,401 B2 | 3/2007 | Ausen |
| 7,198,743 B2 | 4/2007 | Tuma |
| 7,214,334 B2 | 5/2007 | Jens |
| 7,235,202 B2 | 6/2007 | Seth |
| 7,241,483 B2 | 7/2007 | Ausen |
| 7,373,698 B2 | 5/2008 | Erdman |
| 7,423,088 B2 | 9/2008 | Mäder |
| D794,181 S * | 8/2017 | Gilbert .......... D24/126 |
| D796,033 S * | 8/2017 | Gilbert .......... D24/126 |
| 10,000,028 B2 | 6/2018 | Hanschen |
| 2002/0138064 A1 | 9/2002 | Datta |
| 2003/0182776 A1 | 10/2003 | Ausen |
| 2003/0211281 A1 | 11/2003 | Franke |
| 2004/0068848 A1 | 4/2004 | Ausen |
| 2006/0131783 A1 | 6/2006 | Morman |
| 2006/0141887 A1 | 6/2006 | Morman |
| 2006/0293635 A1 | 12/2006 | Petersen |
| 2007/0039142 A1 | 2/2007 | Petersen |
| 2008/0140043 A1 | 6/2008 | Mandzsu |
| 2010/0025888 A1 | 2/2010 | Bader |
| 2011/0147475 A1 | 6/2011 | Biegler |
| 2011/0151171 A1 | 6/2011 | Biegler |
| 2011/0189423 A1* | 8/2011 | Townsend .......... A44B 18/0065 428/58 |
| 2013/0149488 A1* | 6/2013 | Chandrasekaran ..... B29C 48/12 428/99 |
| 2013/0289514 A1* | 10/2013 | Cheng ............. A61F 13/5633 604/391 |
| 2014/0295134 A1* | 10/2014 | Wood .......... B32B 5/18 428/135 |
| 2014/0332999 A1* | 11/2014 | Rothwell ............. D01D 5/426 264/172.11 |
| 2014/0349062 A1* | 11/2014 | Chandrasekaran ........ C08J 5/18 428/99 |
| 2014/0349079 A1* | 11/2014 | Chandrasekaran ..... B32B 27/12 428/159 |
| 2014/0350507 A1 | 11/2014 | Pariseau |
| 2015/0327634 A1* | 11/2015 | Kirby .......... A44B 18/0053 24/452 |
| 2017/0022339 A1* | 1/2017 | Hanschen ............. B32B 5/147 |
| 2017/0120561 A1* | 5/2017 | Huang .......... B32B 15/18 |
| 2017/0181947 A1 | 6/2017 | Sakurai |
| 2018/0215901 A1* | 8/2018 | Kurokawa .......... B32B 27/322 |
| 2018/0222143 A1* | 8/2018 | Gilbert ............. B32B 37/0053 |
| 2018/0368535 A1* | 12/2018 | Gilbert .......... B29C 55/08 |
| 2019/0001653 A1 | 1/2019 | Gilbert |
| 2019/0187345 A1* | 6/2019 | Gold .......... A41D 13/01 |
| 2019/0350778 A1* | 11/2019 | Qi .......... A61F 13/581 |
| 2020/0139612 A1* | 5/2020 | Gilbert .......... B32B 37/144 |

FOREIGN PATENT DOCUMENTS

| | | |
|---|---|---|
| WO | WO 1998-28134 | 7/1998 |
| WO | WO 2005-110719 | 11/2005 |
| WO | WO 2015-095749 | 6/2015 |
| WO | WO 2015-179368 | 11/2015 |
| WO | WO 2017-112603 | 6/2017 |

OTHER PUBLICATIONS

Chu, "Crystal Transformation and Micropore Formation During Uniaxial Drawing of β-Form Polypropylene Film", Polymer, 1995, vol. 36, No. 13, pp. 2523-2530.

Chu, "Microvoid Formation Process During the Plastic Deformation of β-Form Polypropylene", Polymer, 1994, vol. 35, No. 16, pp. 3442-3448.

International Search Report for PCT International Application No. PCT/US2016/067609, dated Mar. 31, 2017, 4 pages.

* cited by examiner

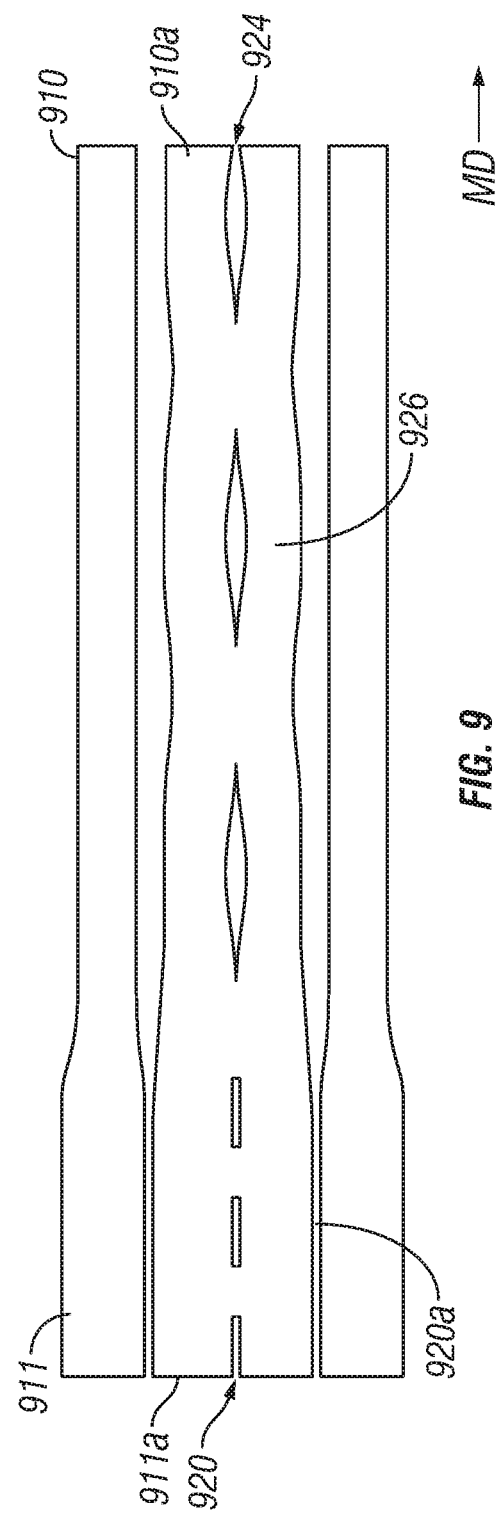

FASTENING ARTICLES AND METHODS OF MAKING THE SAME

CROSS-REFERENCE TO RELATED APPLICATION

This application is a national stage filing under 35 U.S.C. 371 of PCT/US2016/067609, filed Dec. 19, 2016, which claims priority to U.S. Provisional Application Nos. 62/270,407 and 62/270,381, filed Dec. 21, 2015, the disclosures of which are incorporated by reference in their entirety herein.

BACKGROUND

Articles with one or more structured surfaces are useful in a variety of applications (e.g., abrasive discs, assembly of automobile parts, and disposable absorbent articles). The articles may be provided as films that exhibit, for example, increased surface area, mechanical fastening structures, or optical properties.

Mechanical fasteners, which are also called hook and loop fasteners, typically include a plurality of closely spaced upstanding projections with loop-engaging heads useful as hook members, and loop members typically include a plurality of woven, nonwoven, or knitted loops. Mechanical fasteners are useful for providing releasable attachment in numerous applications. For example, mechanical fasteners are widely used in wearable disposable absorbent articles to fasten such articles around the body of a person. In typical configurations, a hook strip or patch on a fastening tab attached to the rear waist portion of a diaper or incontinence garment, for example, can fasten to a landing zone of loop material on the front waist region, or the hook strip or patch can fasten to the backsheet (e.g., nonwoven backsheet) of the diaper or incontinence garment in the front waist region. Mechanical fasteners are also useful for disposable articles such as sanitary napkins. A sanitary napkin typically includes a backsheet that is intended to be placed adjacent to the wearer's undergarment. The backsheet may comprise hook fastener elements to securely attach the sanitary napkin to the undergarment, which mechanically engages with the hook fastener elements.

U.S. Pat. No. 6,582,642 (Buzzell et al.) and U.S. Pat. No. 7,897,078 (Petersen et al.) disclose laminates formed from stretched thermoplastic layers having upstanding male fastening elements. Structured surfaces can be joined to a fabric to provide a laminate with higher strength, softness, and/or function in comparison to the structured surface itself. Mechanical fasteners are reported to be joinable to a second material using adhesives, extrusion lamination, thermal bonding, ultrasonic welding, and sewing.

SUMMARY

The present disclosure provides articles and methods that include a thermoplastic layer that has features associated with being first cut to a size suitable for a particular application (e.g., suitable for a fastening tab) and subsequently stretched. The present disclosure addresses provides a solution to shortcomings of stretching a wide thermoplastic web and then optionally laminating it and cutting it to size suitable for a particular application.

In one aspect, the present disclosure provides an article including a thermoplastic layer having opposing first and second side edges and first and second surfaces. The first surface of the thermoplastic layer bears a plurality of male fastening elements. The thermoplastic layer is plastically deformed and has a retardance profile having an average retardance along a line from the first edge to a location 500 micrometers from the first edge and a distance from the first edge where 75% of the average retardance is observed of at least 10 micrometers. A distance between the first and second side edges is up to 50 millimeters. Often, the thermoplastic layer has an average retardance along a line from the second edge to a location 500 micrometers from the second edge and a distance from the second edge where 75% of the average retardance is observed of at least 10 micrometers.

In another aspect, the present disclosure provides an article including a substrate and a thermoplastic layer joined to the substrate. The thermoplastic layer has opposing first and second side edges and first and second surfaces. The first surface of the thermoplastic layer bears a plurality of male fastening elements. The thermoplastic layer is plastically deformed and has a retardance profile having an average retardance along a line from the first edge to a location 500 micrometers from the first edge and a distance from the first edge where 75% of the average retardance is observed of at least 10 micrometers. The article is a fastening tab. Often, the thermoplastic layer has an average retardance along a line from the second edge to a location 500 micrometers from the second edge and a distance from the second edge where 75% of the average retardance is observed of at least 10 micrometers.

In another aspect, the present disclosure provides an absorbent article that includes either of the aforementioned articles.

In another aspect, the present disclosure provides a method of making an article that includes a thermoplastic layer. The method includes stretching a thermoplastic film to form the thermoplastic layer that is plastically deformed. The thermoplastic film has a first surface extending between opposing first and second side edges with a distance between the opposing first and second side edges of up to 50 millimeters. The first surface of the thermoplastic film bears a plurality of male fastening elements.

The present disclosure also provides convenient methods for making fastening laminates. In one aspect, the present disclosure provides a method of making a fastening laminate. The method includes stretching the thermoplastic film to form a thermoplastic layer that is plastically deformed, and laminating the second surface of the thermoplastic layer to a substrate to make the fastening laminate. The thermoplastic film has a first surface bearing a plurality of male fastening elements. Conveniently, the laminate may be a fastening tab that has a size suitable for use immediately upon stretching and laminating, without further need for cutting the laminate. In some embodiments, the method includes unwinding a thermoplastic film from a roll.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated (e.g., 1 to 5 includes 1, 1.5, 2, 2.75, 3, 3.80, 4, 5, etc.).

The terms "first" and "second" are used in this disclosure. It will be understood that, unless otherwise noted, those terms are used in their relative sense only. The designation of "first" and "second" may be applied to the major surfaces of the thermoplastic layer merely as a matter of convenience in the description of one or more of the embodiments.

The terms "multiple" and "a plurality" refer to more than one.

The term "machine direction" (MD) as used herein denotes the direction of a running web of material during a manufacturing process. When a strip is cut from a continuous web, the dimension in the machine direction corresponds to the length "L" of the strip. The terms "machine direction" and "longitudinal direction" may be used interchangeably. The term "cross-machine direction" (CD) as used herein denotes the direction which is essentially perpendicular to the machine direction. When a strip is cut from a continuous web, the dimension in the cross-machine direction corresponds to the width "W" of the strip. Accordingly, the term "width" typically refers to the shorter dimension in the plane of the first surface of thermoplastic layer, which is the surface bearing the male fastening elements. As used herein the term "thickness" usually refers to the smallest dimension of the thermoplastic layer, which is the dimension perpendicular to the first surface of the thermoplastic layer.

The term "in-line," as used herein, refers to steps that are completed without the thermoplastic layer being rolled up on itself. The steps may be completed sequentially with or without additional steps in-between. For clarification, the thermoplastic layer may be supplied in rolled form and the finished laminate may be rolled up on itself. However, the thermoplastic layer is not rolled up on itself in between, for example, after either stretching or relaxing steps.

The term "edge effect," as used herein, refers to an appreciable drop in retardance near the edge of a layer, for example, in a range from 10 micrometers to 50 micrometers from the edge. An appreciable drop in retardance may be at least 20% or at least 25% in a range from 10 micrometers to 50 micrometers from the edge.

Percent elongation and percent tensile strain are used interchangeably. It is calculated from the following formula: (final length−initial length/initial length)×100.

Draw ratio refers to the linear draw ratio: final length divided by initial length.

The above summary of the present disclosure is not intended to describe each disclosed embodiment or every implementation of the present disclosure. The description that follows more particularly exemplifies illustrative embodiments. It is to be understood, therefore, that the drawings and following description are for illustration purposes only and should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings, in which:

FIG. 9 is a top view of another embodiment of an article and method according to the present disclosure.

DETAILED DESCRIPTION

Figure 1:
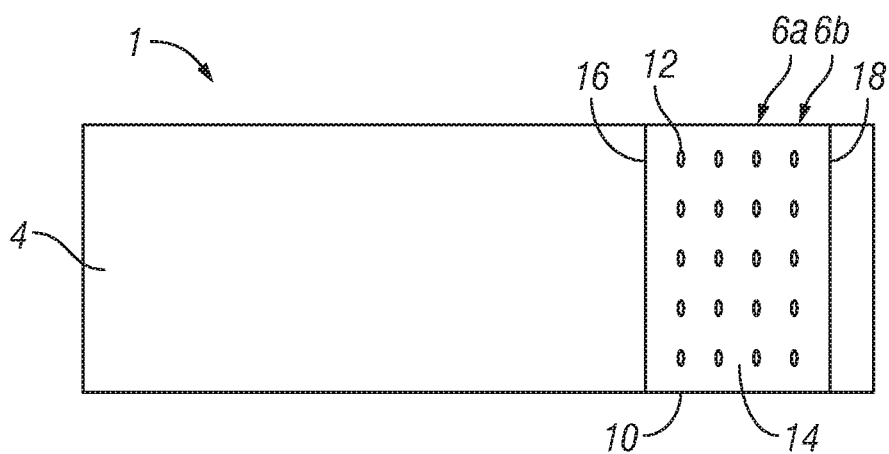
FIG. 1 is a top view of an article according to the present disclosure.

Reference will now be made in detail to embodiments of the disclosure, one or more examples of which are illustrated in the drawings. Features illustrated or described as part of one embodiment can be used with other embodiments to yield still a third embodiment. It is intended that the present disclosure include these and other modifications and variations.

FIG. 1 illustrates an article of the present disclosure. The article 1 includes a thermoplastic layer 10 with opposing side edges 16, 18, a first surface 14, and a second surfaces (not shown in FIG. 1). The first surface 14 of the thermoplastic layer 10 is the surface that is visible in FIG. 1. Illustrated article 1 has a thermoplastic layer 10 with male fastening elements 12 projecting from a first surface 14 of the thermoplastic layer 10. The first surface (that is, the surface with male fastening elements) can also be called the first major surface in any of the embodiments disclosed herein. In the illustrated embodiment, the thermoplastic layer 10 is attached to a substrate 4. The article may be useful, for example, as a fastening tab (e.g., for attaching an absorbent article to a body.) The thermoplastic layer is plastically deformed and has a retardance profile extending between the side edges that drops off appreciably near each edge to create an edge effect. The edge effect results from the thermoplastic layer being first cut to a size suitable for a particular application (e.g., suitable for a fastening tab) and subsequently stretched.

In some embodiments, a distance between the side edges 16, 18 of thermoplastic layer 10 is up to 50 millimeters. The distance between the side edges 16, 18 can also be called the width of the thermoplastic layer. In some embodiments, before stretching, the thermoplastic layer has a width of 10 millimeters (mm) to 50 mm (in some embodiments, 10 mm to 40 mm or 10 mm to 30 mm). Stretching a narrow thermoplastic layer (e.g., having a width of 10 mm to 50 mm, 10 mm to 40 mm, or 10 mm to 30 mm), can be advantageous over stretching a wider web (e.g., having a width of at least 100 mm, 200 mm, 250 mm, 500 mm, or 750 mm). For example, when webs are stretched, cross-web caliper variations can be observed, with more stretching occurring in the center of the web than at the edges. Because of this, the edges are generally trimmed off to not cause hardbands when the web is rolled up in a jumbo. Such differences in caliper are minimized when a narrow web is stretched. Also, when a thermoplastic layer is stretched, it becomes thinner Difficulties in handling thinner webs can be more pronounced in wider webs than in narrower webs.

Stretching narrow thermoplastic layers and laminating, for example, in-line can be useful for tuning the thermoplastic layer having male fastening elements to a desired performance without having to maintain multiple rolls of inventory. For example, a single roll of a narrow thermoplastic layer can be stretched to different extents for different products made on the same manufacturing line. Different stretch ratios can be useful to achieving different densities of male fastening elements, which can affect the peel and shear performance of a male fastener, as described in further detail below.

When a narrow thermoplastic layer (e.g., having a width of 10 mm to 50 mm, 10 mm to 40 mm, or 10 mm to 30 mm) is stretched, the thermoplastic layer can have different birefringent properties than when a wider web (e.g., having a width of at least 100 mm, 200 mm, 250 mm, 500 mm, or 750 mm) is stretched and subsequently slit to the dimensions of the narrower web. Since the center of a web is typically stretched more than the edges, the edges of a thermoplastic layer that is slit to a narrow dimension and subsequently stretched has different retardance properties than the edges of a thermoplastic layer that was formed by stretching a wider web and subsequently slitting it to a narrow dimension. Retardance refers to how out of phase the two polarization components of the light are that are refracted by a birefringent material. Birefringence can be calculated from retardance using the film thickness. It is observed that a web prepared by stretching a wider web and subsequently slitting to a narrow dimension can have a sharper drop-off in retardance near its slit edges than a thermoplastic layer prepared by stretching a narrow web. The drop-off in retardance from the edge can be determined by measuring the retardance in a film sample continuously along a line in the direction transverse to the stretching direction starting at the sample edge and ending 500 micrometers from the sample edge. The average retardance over this distance is then calculated. Next the distance from the edge at which the retardance reaches 75% of the average retardance is measured. This can be referred to as the 75% average retardance distance. The lower the change in retardance within 500 micrometers from the edge, the smaller this distance will be. On the other hand, a significant change in retardance within 500 micrometers from the edge of the thermoplastic layer results in a larger 75% average retardance distance and can indicate an "edge effect". In some embodiments, the thermoplastic layer has a 75% average retardance of greater than 10 micrometers, 15 micrometers, or 20 micrometers. In some embodiments, the thermoplastic layer that is slit to a narrow dimension and subsequently stretched has a 75% average retardance distance of at least 1.5 times, at least twice, or at least 2.5 times 75% average retardance distance than a thermoplastic layer formed by stretching a wider web and subsequently slitting it to a narrow dimension. The measurements can be made using a polarization microscope such as a "LEICA DMRXE", type TCS, obtained from Microsystems GmbH, Wetzlar, Germany, equipped with an LC-Polscope system from CRi Inc., now part of PerkinElmer Inc., Waltham, Mass., using a Q Imaging Retiga Exi FAST1394 camera. Further details are provided in the Examples, below.

In a given fastening tab as shown in FIG. 1, an edge effect as described above will be observed on both edges 16, 18 if a narrow thermoplastic layer (e.g., having a width of 10 mm to 50 mm, 10 mm to 40 mm, or 10 mm to 30 mm) was stretched before lamination to the substrate. To the contrary, if a wider web was stretched, and subsequently a center portion of the wide web was slit to a width of 10 mm to 50 mm, for example, there would be a sharp drop-off in retardance at both edges 16, 18 so an edge effect would not be observed. If an end portion of the stretched wide web was slit to a width of 10 mm to 50 mm, for example, there could be an edge effect as described above at only one edge, but not the other. In the article or fastening tab according to the present disclosure, the edge effect is observed at each edge.

In some embodiments of the article of the present disclosure and/or made according to the method of the present disclosure, the second surface of the thermoplastic layer is free of male fastening elements. In some embodiments of the article of the present disclosure and/or made according to the method of the present disclosure, there are multiple rows of the male fastening elements between the side edges of the thermoplastic layer. Thermoplastic layer 10 illustrated in FIG. 1 has multiple rows 6a, 6b of male fastening elements 12 projecting from a first surface 14. The term "row" refers to male fastening elements lined up in a particular direction. A row or line of male fastening elements may be substantially straight. In the illustrated embodiment, the rows are parallel to the side edges of the thermoplastic layer, but this is not a requirement.

Figure 2:
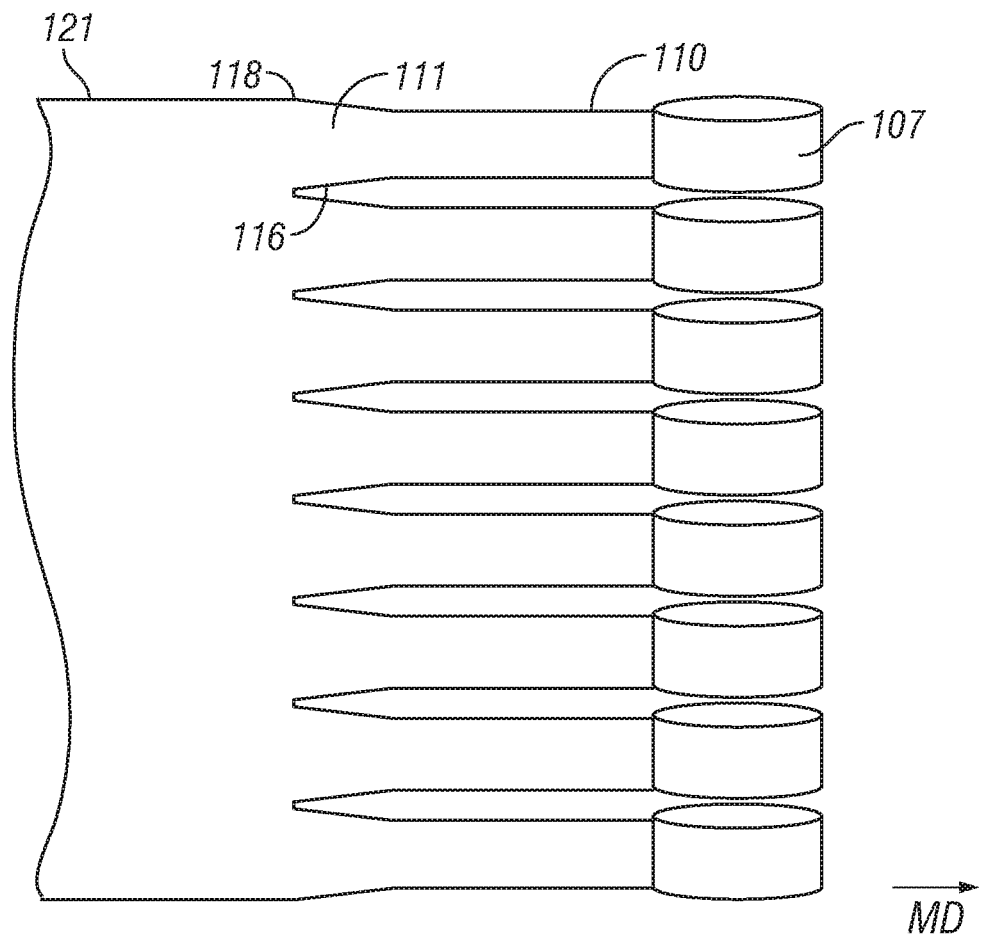
FIG. 2 is a top view of an embodiment of an article and method according to the present disclosure.

FIG. 2 illustrates method of making the thermoplastic layer in the article shown in FIG. 1, for example. FIG. 2 illustrates film 111 with a distance between the two opposing side edges 116, 118 of up to 50 millimeters. The first surface of the thermoplastic layer bears a plurality of male fastening elements (not shown). In FIG. 2, the film 111 is stretched to form the thermoplastic layer 110, which is plastically deformed. Stretching in the machine direction (MD) can be carried out, for example, using rollers at different speeds. As shown in FIG. 2, the thermoplastic film 111 will typically neck in and decrease in width upon forming thermoplastic layer 110. While in the embodiment shown in FIG. 2, the thermoplastic layer 110 is rolled up into a roll 107, the thermoplastic layer 110 could also be laminated to a substrate as described in further detail below.

While a thermoplastic film having a first surface bearing a plurality of male fastening elements can be made as described using any of the methods (e.g., molding) described below with a width of 10 mm to 50 mm 10 mm to 40 mm, or 10 mm to 30 mm, in some embodiments, including the embodiment shown in FIG. 2, this narrow thermoplastic film is cut from a thermoplastic web 121 having a wider width (e.g., having a width of at least 100 mm, 200 mm, 250 mm, 500 mm, or 750 mm). For example, for a wide thermoplastic web 121 having a width at least twice the desired distance between the two opposing side edges 116, 118 of the thermoplastic film 111, the method can further comprise slitting the wide web 121 to form at least two of the thermoplastic films 111. In some embodiments, the wide thermoplastic web 121 has a width of at least 3, 4, 5, 6, 7, 8, 9, 10, 20, 30, 40, 50 or more times the thermoplastic film 111, and slitting the wide web 121 can form at least 3, 4, 5, 6, 7, 8, 9, 10, 20, 30, 40, 50 or more of the thermoplastic films 111. In these embodiments, the at least two of the thermoplastic films 111 can be stretched simultaneously. In some embodiments, the at least two of the thermoplastic films 111 remain connected to the wide thermoplastic web 121 during at least a portion of the stretching. In either the case of the thermoplastic film to be molded to have a narrow web or the case of a narrow thermoplastic film being cut from a wider web, providing the film can be carried out by unwinding a roll of wide thermoplastic web or thermoplastic film.

Figure 3:
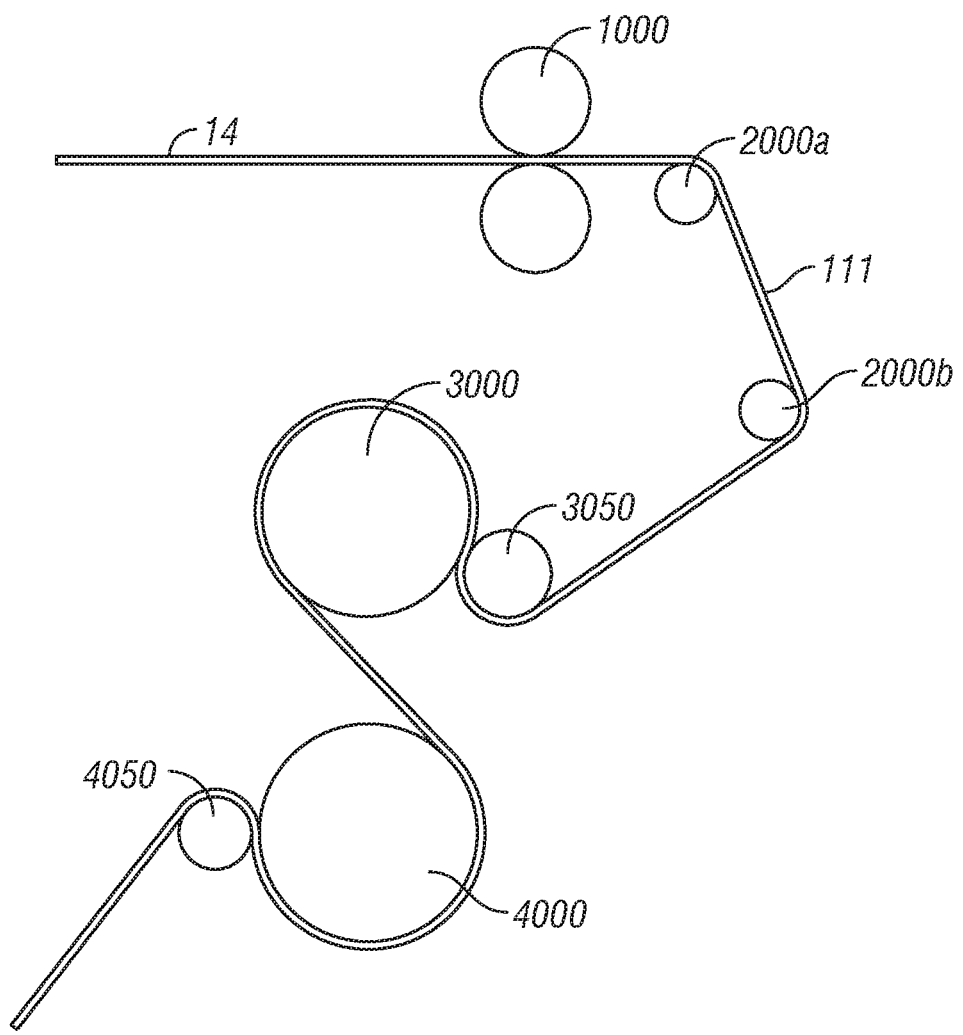
FIG. 3 is a diagrammatical view of an embodiment of carrying out the method according to the present disclosure.

FIG. 3 is a diagrammatical view of an embodiment of carrying out the method according to the present disclosure. In the embodiment shown in FIG. 3, input thermoplastic web 121 is passed through a rotary die cutter 1000 to provide the several thermoplastic films 111. Although a rotary die cutter is show, a bank of razor cutters may also be useful. The thermoplastic films 111 are then passed by web guides 2000a and 2000b before reaching the rolls of different speeds 3000 and 4000. In some embodiments, the thermoplastic films 111 are passed through a nip point made by roll 3050 and a high friction roll 3000 running at the same speed as the perforation die 1000 (1×). The male fastening elements can be touching the high-friction roll. The thermoplastic films 111 then leave the high-friction roll 3000 and wrap around a heated metal roll 4000 in an S-wrap fashion. The male fastening elements can be positioned away from the metal roll. Initially the thermoplastic films 111 may slip on the metal roll but begin to stretch as they are heated up on the higher-speed, heated metal roll 4000. The stretched thermoplastic layers 110 can be nipped upon exiting the metal roll 4000 using roll 4050. In some embodiments, a heated metal roll at a 1× line speed can be followed by a high-friction roll at a faster line speed to stretch the thermoplastic layers. Roller 4000 can be set at any speed that would cause the thermoplastic films 111 to stretch a desired amount. For example, the first roller 3000 would be set at a speed of 1.0×, and the second roller 4000 could be set at a speed of 2× to achieve a 2× stretch, 2.5× to achieve a 2.5× stretch, or 3× to achieve a 3× stretch. In the method according to the present disclosure, the distance between the different speed rolls may be adjusted as desired. In some embodiments, short air gaps between the rolls (in other words, short draw instead of long draw) may be desired to improve the consistency of the stretching. A short draw process may give a larger process window and the ability to reach higher line speeds. The length of the gap between rolls can also affect the extent of necking and the resulting width of the thermoplastic layers 110. In the embodiment illustrated in FIG. 3, the method uses S-wraps to handle and stretch the thermoplastic layer. In some embodiments, the method according to the present disclosure employs nip rolls for handling and stretching the thermoplastic layer.

Slitting a wide thermoplastic web as described in connection with FIGS. 2 and 3 can be carried out in a variety of ways. For example, razor cutting of a continuous web having male fastening elements may be useful. Other cutting methods (e.g., laser cutting, rotary die cutting, crush cutting, or shear cutting) may also be useful. Cutting can be performed from either surface of the continuous web. A slit may be cut "through" the web having mechanical fastening elements, which means that the slit cuts through the entire thickness of the web. In other embodiments, the slits may be partial-depth slits as long the partial-depth slits can fracture and separate when the slit web is stretched. The partial-depth slit may penetrate, for example, 85, 90, or 95 percent of the thickness of the web or more, which means the solution to the equation:

(depth of the slit divided by the thickness of the web)×100 is at least 85, 90, or 95 in some embodiments. Partial depth slits may be useful for increasing die life in some cases and may provide web handling benefits.

FIGS. 2 and 3 illustrate embodiments in which slitting and stretching to make an article according to the present disclosure are carried out in-line.

Stretching the thermoplastic layer is carried out to an extent that it plastically deforms. Depending on the thermoplastic from which the thermoplastic layer is made, the draw ratio sufficient to plastically deform the thermoplastic layer can be at least 1.20, 1.25, 1.30, 1.5, or more. In some embodiments, the draw ratio used for stretching the thermoplastic layer is about 2.0, 2.25, 2.5, 2.75, or 3.

The maximum draw ratio is limited by the tensile strength of the selected material. In some embodiments, the thermoplastic layer is stretched with a draw ratio of 1.25 to 5 in at least one direction. In some embodiments, the thermoplastic layer is stretched with a draw ratio of 1.5 to 4 in at least one direction. Draw ratios of up to 5, 7.5, or 10 may be useful, depending on material selection and the temperature of the thermoplastic layer when it is stretched.

As described above, stretching the thermoplastic layer in the machine direction can be performed by propelling the web over rolls of increasing speed, with the downweb roll speed faster than the upweb roll speed. In some embodiments, it is useful to stretch in the machine direction at a speed of up to 350 meters per minute, 300 meters per minute, 250 meters per minute, 200 meters per minute, 100 meters per minute, 75 meters per minute, 50 meters per minute, 25 meters per minute, 10 meters per minute, or 5 meters per minute.

In any of the embodiments of the method described herein, the rolls used for stretching the thermoplastic layer and, in some embodiments, relaxing and laminating it to a substrate may be made from various materials. At least some of the rolls may be smooth metal (e.g., aluminum or steel) rolls. Also, at least some of rolls may be provided with a coating. The coating type on the rolls may influence how the thermoplastic layer is grabbed by the rolls and therefore also have an influence on how the thermoplastic layer stretches. A high-friction coating may be useful, for example. The high-friction coating can be, for example, a plasma coating known to provide a high-friction surface. Suitable plasma coatings include those available, for example, from Plasma Coating, Middlebury, Conn., under product family designations "10000" and "10015". The high-friction coating may also be a coating or layer of a rubbery material.

In some embodiments, the method according to the present disclosure further comprises heating the thermoplastic layer. Heating may be useful, for example, before or during the stretching or a combination thereof. This may allow the thermoplastic layer to be more flexible for stretching and improve the uniformity of stretching. Also, if more heat is applied during the stretching process, less relaxing may be needed before laminating to reduce curl. In some embodiments in which the thermoplastic layer is a polypropylene backing, stretching is carried out in a temperature range from 80° C. to 110° C., 85° C. to 100° C., or 90° C. to 95° C. In some embodiments, the thermoplastic layer can be heated after stretching, for example, during the relaxing of the thermoplastic layer. Heating at such a time may be useful for annealing the thermoplastic layer.

For any of these purposes, heating can be provided, for example, by IR irradiation, hot air treatment or by performing the stretching and/or relaxing in a heat chamber. Rollers that may be used for stretching the thermoplastic backing in the machine direction may be heated. Heated rollers may also be useful, for example, for annealing the stretched thermoplastic layer. For annealing, the heated thermoplastic layer can also be directed onto a chilled roller for rapid cooling. Annealing the stretched thermoplastic layer may be useful before laminating it to a substrate, for example, to reduce curl as described below. In some embodiments, heating is only applied to the second surface of the thermoplastic layer (i.e., the surface opposite the first surface from which the discrete elements protrude) to minimize any damage to the male fastening elements that may result from heating. For example, in these embodiments, only rollers that are in contact with the second surface of the thermoplastic backing are heated. Heating is typically only carried out below the melting temperature of the thermoplastic layer.

In some embodiments, the thermoplastic layer is stretched in both the machine direction and cross-direction. Stretching in a cross-machine direction can be carried out on a continuous web using, for example, diverging rails or diverging disks. A versatile stretching method that allows for monoaxial and sequential biaxial stretching of the thermoplastic layer employs a flat film tenter apparatus. Such an apparatus grasps the thermoplastic layer using a plurality of clips, grippers, or other film edge-grasping means along opposing edges of the thermoplastic web in such a way that monoaxial and biaxial stretching in the desired direction is obtained by propelling the grasping means at varying speeds along divergent rails. Increasing clip speed in the machine direction generally results in machine-direction stretching. Stretching at angles to the machine direction and cross-direction are also possible with a flat film tenter apparatus. Monoaxial and biaxial stretching can also be accomplished, for example, by the methods and apparatus disclosed in U.S. Pat. No. 7,897,078 (Petersen et al.) and the references cited therein. Flat film tenter stretching apparatuses are commercially available, for example, from Bruckner Maschinenbau GmbH, Siegsdorf, Germany.

The thermoplastic layer useful for practicing the method disclosed herein may be made from a variety of suitable materials. Examples of suitable thermoplastic materials include polyolefin homopolymers such as polyethylene and polypropylene, copolymers of ethylene, propylene and/or butylene; copolymers containing ethylene such as ethylene vinyl acetate and ethylene acrylic acid; polyesters such as poly(ethylene terephthalate), polyethylene butyrate, and polyethylene napthalate; polyamides such as poly(hexamethylene adipamide); polyurethanes; polycarbonates; poly(vinyl alcohol); ketones such as polyetheretherketone; polyphenylene sulfide; and mixtures thereof. In some embodiments, the thermoplastic layer comprises at least one of a polyolefin, a polyamide, or a polyester. In some embodiments, the thermoplastic is a polyolefin (e.g., polyethylene, polypropylene, polybutylene, ethylene copolymers, propylene copolymers, butylene copolymers, and copolymers and blends of these materials).

For any of the embodiments in which the thermoplastic layer includes polypropylene, the polypropylene may include alpha and/or beta phase polypropylene. In some cases, a thermoplastic layer as described above that includes beta-phase polypropylene before stretching may include alpha-phase polypropylene after stretching to form the stretched thermoplastic layer. Semi-crystalline polyolefins can have more than one kind of crystal structure. For example, isotactic polypropylene is known to crystallize into at least three different forms: alpha (monoclinic), beta (pseudohexangonal), and gamma (triclinic) forms. In melt-crystallized material the predominant form is the alpha or monoclinic form. The beta form generally occurs at levels of only a few percent unless certain heterogeneous nuclei are present or the crystallization has occurred in a temperature gradient or in the presence of shearing forces. The heterogeneous nuclei are typically known as beta-nucleating agents, which act as foreign bodies in a crystallizable polymer melt. When the polymer cools below its crystallization temperature (e.g., a temperature in a range from 60° C. to 120° C. or 90° C. to 120° C.), the loose coiled polymer chains orient themselves around the beta-nucleating agent to form beta-phase regions. The beta form of polypropylene is a meta-stable form, which can be converted to the more stable alpha form by thermal treatment and/or applying stress. In some embodiments, the thermoplastic layer comprises a beta-nucleating agent. Micropores can be formed in various amounts when the beta-form of polypropylene is stretched under certain conditions; see, e.g., Chu et al., "Microvoid formation process during the plastic deformation of β-form polypropylene", *Polymer*, Vol. 35, No. 16, pp. 3442-3448, 1994, and Chu et al., "Crystal transformation and micropore formation during uniaxial drawing of β-form polypropylene film", *Polymer*, Vol. 36, No. 13, pp. 2523-2530, 1995. Pore sizes achieved from this method can range from about 0.05 micrometer to about 1 micrometer, in some embodiments, about 0.1 micrometer to about 0.5 micrometer. In some embodiments, at least a portion of the thermoplastic layer is microporous after stretching and relaxing.

Generally, when the thermoplastic layer comprises polypropylene, it should be understood that the thermoplastic layer may comprise a polypropylene homopolymer or a copolymer containing propylene repeating units. The copolymer may be a copolymer of propylene and at least one other olefin (e.g., ethylene or an alpha-olefin having from 4 to 12 or 4 to 8 carbon atoms). Copolymers of ethylene, propylene and/or butylene may be useful. In some embodiments, the copolymer contains up to 90, 80, 70, 60, or 50 percent by weight of polypropylene. In some embodiments, the copolymer contains up to 50, 40, 30, 20, or 10 percent by weight of at least one of polyethylene or an alpha-olefin. The thermoplastic layer may also comprise a blend of thermoplastic polymers that includes polypropylene. Suitable thermoplastic polymers include crystallizable polymers that are typically melt processable under conventional processing conditions. That is, on heating, they will typically soften and/or melt to permit processing in conventional equipment, such as an extruder, to form a sheet. Crystallizable polymers, upon cooling their melt under controlled conditions, spontaneously form geometrically regular and ordered chemical structures. Examples of suitable crystallizable thermoplastic polymers include addition polymers, such as polyolefins. Useful polyolefins include polymers of ethylene (e.g., high density polyethylene, low density polyethylene, or linear low density polyethylene), an alpha-olefin (e.g, 1-butene, 1-hexene, or 1-octene), styrene, and copolymers of two or more such olefins. A blend of thermoplastic polymers may comprise mixtures of stereo-isomers of such polymers, e.g., mixtures of isotactic polypropylene and atactic polypropylene or of isotactic polystyrene and atactic polystyrene. In some embodiments, a blend that includes polypropylene contains up to 90, 80, 70, 60, or 50 percent by weight of polypropylene. In some embodiments, the blend contains up to 50, 40, 30, 20, or 10 percent by weight of at least one of polyethylene or an alpha-olefin.

In embodiments of the method according to the present disclosure in which the thermoplastic layer comprises a beta-nucleating agent, the beta-nucleating agent may be any inorganic or organic nucleating agent that can produce beta-spherulites in a melt-formed sheet comprising polyolefin. Useful beta-nucleating agents include gamma quinacridone, an aluminum salt of quinizarin sulphonic acid, dihydroquinoacridin-dione and quinacridin-tetrone, triphenenol ditriazine, calcium silicate, dicarboxylic acids (e.g., suberic, pimelic, ortho-phthalic, isophthalic, and terephthalic acid), sodium salts of these dicarboxylic acids, salts of these dicarboxylic acids and the metals of Group IIA of the periodic table (e.g., calcium, magnesium, or barium), delta-quinacridone, diamides of adipic or suberic acids, different types of indigosol and cibantine organic pigments, quiancridone quinone, N',N'-dicyclohexil-2,6-naphthalene dicarboxamide (available, for example, under the trade designation "NJ-Star NU-100" from New Japan Chemical Co. Ltd.), antraquinone red, and bis-azo yellow pigments. The properties of the extruded film are dependent on the selection of the beta nucleating agent and the concentration of the beta-nucleating agent. In some embodiments, the beta-nucleating agent is selected from the group consisting of gamma-quinacridone, a calcium salt of suberic acid, a calcium salt of pimelic acid and calcium and barium salts of polycarboxylic acids. In some embodiments, the beta-nucleating agent is quinacridone colorant Permanent Red E3B, which is also referred to as Q-dye. In some embodiments, the beta-nucleating agent is formed by mixing an organic dicarboxylic acid (e.g., pimelic acid, azelaic acid, o-phthalic acid, terephthalic acid, and isophthalic acid) and an oxide, hydroxide, or acid salt of a Group II metal (e.g., magnesium, calcium, strontium, and barium). So-called two component initiators include calcium carbonate combined with any of the organic dicarboxylic acids listed above and calcium stearate combined with pimelic acid. In some embodiments, the beta-nucleating agent is aromatic tri-carboxamide as described in U.S. Pat. No. 7,423,088 (Mader et al.).

A convenient way of incorporating beta-nucleating agents into a semi-crystalline polyolefin useful for making a thermoplastic layer for the method disclosed herein is through the use of a concentrate. A concentrate is typically a highly loaded, pelletized polypropylene resin containing a higher concentration of nucleating agent than is desired in the final thermoplastic layer. The nucleating agent is present in the concentrate in a range of 0.01% to 2.0% by weight (100 to 20,000 ppm), in some embodiments in a range of 0.02% to 1% by weight (200 to 10,000 ppm). Typical concentrates are blended with non-nucleated polyolefin in the range of 0.5% to 50% (in some embodiments, in the range of 1% to 10%) by weight of the total polyolefin content of the thermoplastic layer. The concentration range of the beta-nucleating agent in the final thermoplastic layer may be 0.0001% to 1% by weight (1 ppm to 10,000 ppm), in some embodiments, 0.0002% to 0.1% by weight (2 ppm to 1000 ppm). A concentrate can also contain other additives such as stabilizers, pigments, and processing agents.

The level of beta-spherulites in the thermoplastic layer can be determined, for example, using X-ray crystallography and Differential Scanning calorimetry (DSC). By DSC, melting points and heats of fusion of both the alpha phase and the beta phase can be determined in a thermoplastic layer useful for practicing the present disclosure. For semi-crystalline polypropylene, the melting point of the beta phase is lower than the melting point of the alpha phase (e.g., by about 10 to 15 degrees Celsius). The ratio of the heat of fusion of the beta phase to the total heat of fusion provides a percentage of the beta-spherulites in a sample. The level of beta-spherulites can be at least 10, 20, 25, 30, 40, or 50 percent, based on the total amount of alpha and beta phase crystals in the film. These levels of beta-spherulites may be found in the thermoplastic layer before it is stretched.

Since the thermoplastic layer stretched according to the present disclosure is plastically deformed, it should be understood that the thermoplastic backing is generally non-elastic. The term "non-elastic" refers to any material (such as a film that is 0.002 mm to 0.5 mm thick) that does not exhibit recovery from stretching or deformation to a large extent. For example, a non-elastic material that is stretched to a length that is at least about 50 percent greater than its initial length will recover less than about 40, 25, 20, 10, or 5 percent of its elongation upon release of its stretching force. In some embodiments, a non-elastic material may be considered to be a flexible plastic that is capable of undergoing permanent plastic deformation if it is stretched past its reversible stretching region (that is, point A in FIG. 1).

In some embodiments, the thermoplastic layer with male fastening elements can be made from a multilayer or multi-component melt stream of thermoplastic materials. This can result in male fastening elements formed at least partially from a different thermoplastic material than the one predominately forming the backing. Various configurations of upstanding posts made from a multilayer melt stream are shown in U.S. Pat. No. 6,106,922 (Cejka et al.), for example. A multilayer or multi-component melt stream can be formed by any conventional method. A multilayer melt stream can be formed by a multilayer feedblock, such as that shown in U.S. Pat. No. 4,839,131 (Cloeren). A multicomponent melt stream having domains or regions with different components could also be used. Useful multicomponent melt streams could be formed by use of inclusion co-extrusion die or other known methods (e.g., that shown in U.S. Pat. No. 6,767,492 (Norquist et al.).

In the method according to the present disclosure, the thermoplastic layer and the male fastening elements are integral (that is, generally formed at the same time as a unit, unitary). Male fastening elements such as upstanding posts on a thermoplastic layer can be made, for example, by feeding a thermoplastic material onto a continuously moving mold surface with cavities having the inverse shape of the male fastening elements. The thermoplastic material can be passed between a nip formed by two rolls or a nip between a die face and roll surface, with at least one of the rolls having the cavities. Pressure provided by the nip forces the resin into the cavities. In some embodiments, a vacuum can be used to evacuate the cavities for easier filling of the cavities. The nip has a large enough gap such that a coherent thermoplastic layer is formed over the cavities. The mold surface and cavities can optionally be air or water cooled before stripping the integrally formed thermoplastic layer and upstanding posts from the mold surface such as by a stripper roll. In some embodiments, the male fastening elements can be made by a modification of the mold surface described above, in which the cavity includes a main cavity with multiple smaller cavities within the main cavity.

Suitable mold surfaces for forming upstanding posts include tool rolls such as those formed from a series of plates defining a plurality of cavities about its periphery including those described, for example, in U.S. Pat. No. 4,775,310 (Fischer). Cavities may be formed in the plates by drilling or photoresist technology, for example. Other suitable tool rolls may include wire-wrapped rolls, which are disclosed along with their method of manufacturing, for example, in U.S. Pat. No. 6,190,594 (Gorman et al.). Another example of a method for forming a thermoplastic layer with upstanding posts includes using a flexible mold belt defining an array of upstanding post-shaped cavities as described in U.S. Pat. No. 7,214,334 (Jens et al.). Yet other useful methods for forming a thermoplastic layer with upstanding posts can be found in U.S. Pat. No. 6,287,665 (Hammer), U.S. Pat. No. 7,198,743 (Tuma), and U.S. Pat. No. 6,627,133 (Tuma).

In any of the mold surfaces mentioned above, the cavities and the resultant male fastening elements may have a variety of cross-sectional shapes. For example, the cross-sectional shape of the cavity and male fastening element or post may be a polygon (e.g., square, rectangle, rhombus, hexagon, pentagon, or dodecagon), which may be a regular polygon or not, or the cross-sectional shape of the post may be curved (e.g., round or elliptical). The male fastening element may taper from its base to its distal tip, for example, for easier removal from the cavity, but this is not a requirement. The cavity may have the inverse shape of a post having a loop-engaging head or may have the inverse shape of an upstanding post without loop-engaging heads that can be formed into loop-engaging heads, if desired.

If upstanding posts formed upon exiting the cavities do not have loop-engaging heads, loop-engaging heads could be subsequently formed by a capping method as described in U.S. Pat. No. 5,077,870 (Melbye et al.). Typically, the capping method includes deforming the tip portions of the upstanding posts using heat and/or pressure. The heat and pressure, if both are used, could be applied sequentially or simultaneously. The formation of male fastening elements can also include a step in which the shape of the cap is changed, for example, as described in U.S. Pat. No. 6,132,660 (Kampfer). Such capping and cap modification steps can be carried out before or after stretching in the method of making a fastening article disclosed herein.

Another useful method for forming male fastening elements on a thermoplastic layer is profile extrusion described, for example, in U.S. Pat. No. 4,894,060 (Nestegard), which is incorporated herein by reference in its entirety. Typically, in this method a thermoplastic flow stream is passed through a patterned die lip (e.g., cut by electron discharge machining) to form a web having downweb ridges, slicing the ridges, and stretching the web to form separated projections. The ridges may form hook precursors and exhibit the cross-sectional shape of male fastening elements (e.g., with loop-engaging heads) to be formed. The ridges are transversely sliced at spaced locations along the extension of the ridges to form discrete portions of the ridges having lengths in the direction of the ridges essentially corresponding to the length of the male fastening elements to be formed. Providing a thermoplastic layer having a first surface bearing a plurality of male fastening elements can be carried out by transversely slicing such ridges, and stretching the thermoplastic layer so that it plastically deforms results in the separation of the male fastening elements.

As described above, the mold surface can be made to make a thermoplastic layer with a width between side edges of up to 50 millimeters. Or, a wider mold can be used and a wider thermoplastic web can be slit before stretching (e.g., in-line) as described above.

For any of the embodiments described above in which the male fastening elements are upstanding posts with loop-engaging overhangs, the term "loop-engaging" relates to the ability of a male fastening element to be mechanically attached to a loop material. Generally, male fastening elements with loop-engaging heads have a head shape that is different from the shape of the post. For example, the male fastening element may be in the shape of a mushroom (e.g., with a circular or oval head enlarged with respect to the stem), a hook, a palm-tree, a nail, a T, or a J. In some embodiments, each male fastening element includes an upstanding post and a cap with loop engaging overhangs extending in multiple (i.e., at least two) directions, in some embodiments, at least two orthogonal directions. For example, the male fastening element may be in the shape of a mushroom, a nail, a palm tree, or a T. In some embodiments, the male fastening elements are provided with a mushroom head (e.g., with an oval or round cap distal from the thermoplastic layer). The loop-engageability of male fastening elements may be determined and defined by using standard woven, nonwoven, or knit materials. A region of male fastening elements with loop-engaging heads generally will provide, in combination with a loop material, at least one of a higher peel strength, higher dynamic shear strength, or higher dynamic friction than a region of posts without loop-engaging heads. Male fastening elements that have "loop-engaging overhangs" or "loop-engaging heads" do not include ridges described above that are precursors to fastening elements (e.g., elongate ridges that are profile extruded and subsequently cut to form male fastening elements upon stretching in the direction of the ridges). Such ridges would not be able to engage loops before they are cut and stretched. Such ridges would also not be considered male fastening elements. Typically, male fastening elements that have loop-engaging heads have a maximum width dimension (in either dimension normal to the height) of up to about 1 (in some embodiments, 0.9, 0.8, 0.7, 0.6, 0.5, or 0.45) millimeter (mm). In some embodiments, the male fastening elements have a maximum height (above the backing) of up to 3 mm, 1.5 mm, 1 mm, or 0.5 mm and, in some embodiments a minimum height of at least 0.03 mm, 0.05 mm, 0.1 mm, or 0.2 mm. In some embodiments, the male fastening elements have aspect ratio (that is, a ratio of height to width at the base at the thermoplastic layer) of at least about 0.25:1, 1:1, 2:1, 3:1, or 4:1.

The method according to the present disclosure can be useful with thermoplastic layers having a variety of thicknesses. In some embodiments, the thickness of the thermoplastic layer suitable for the method disclosed herein may be up to about 400 micrometers (µm), 300 micrometers, or 250 micrometers and at least about 30 micrometers or 50 micrometers before stretching. This thickness does not include the height of the male fastening elements protruding from the first major surface of the thermoplastic layer. In some embodiments, the thickness of the thermoplastic layer is in a range from 30 to about 225 micrometers, from about 50 to about 200 micrometers, or from about 50 to about 150 micrometers before stretching. In some embodiments, the thermoplastic layer, excluding the discrete elements, is substantially uniform in thickness. For a thermoplastic layer that is substantially uniform in thickness, a difference in thickness between any two points in the thermoplastic layer may be up 5, 2.5, or 1 percent. In some embodiments, after stretching, the thermoplastic layer has an average thickness of up to 80 µm, 75 µm, 70 µm, 65 µm, 60 µm, 55 µm, or 50 µm. In some embodiments, the average thickness of the thermoplastic layer after stretching is in a range from 20 µm to 80 µm, 30 µm to 75 µm, 40 µm to 75 µm, 20 µm to 70 µm, 30 µm to 70 µm, or 20 µm to 50 µm. In general, the thermoplastic layer has no through-holes before or after stretching. In some embodiments, the thermoplastic layer, excluding the discrete elements, is substantially planar. A substantially "planar" thermoplastic layer refers to portions of thermoplastic layer occupying substantially the same plane when placed on a flat surface. The term "substantially" in this regard can mean that a portion of the thermoplastic layer may be out of plane by up to 15, 10, or 5 degrees. A thermoplastic layer that is substantially planar is not corrugated and not profile-extruded to have multiple peaks and valleys.

Male fastening elements on the first surface of the thermoplastic layer may have an initial density (i.e., before stretching) of at least 10 per square centimeter ($cm^2$) (63 per square inch $in^2$). For example, the initial density of the male fastening elements may be at least $100/cm^2$ ($635/in^2$), $248/cm^2$ ($1600/in^2$), $394/cm^2$ ($2500/in^2$), or $550/cm^2$ ($3500/in^2$). In some embodiments, the initial density of the male fastening elements may be up to $1575/cm^2$ ($10000/in^2$), up to about $1182/cm^2$ ($7500/in^2$), or up to about $787/cm^2$ ($5000/in^2$). Initial densities in a range from $10/cm^2$ ($63/in^2$) to $1575/cm^2$ ($10000/in^2$) or $100/cm^2$ ($635/in^2$) to $1182/cm^2$ ($7500/in^2$) may be useful, for example. The spacing of the male fastening elements need not be uniform. In some embodiments, the density of the male fastening elements after stretching may be up to about $1182/cm^2$ ($7500/in^2$) or up to about $787/cm^2$ ($5000/in^2$). Densities after stretching in a range from $2/cm^2$ ($13/in^2$) to $1182/cm^2$ ($7500/in^2$), $124/cm^2$ ($800/in^2$) to $787/cm^2$ ($5000/in^2$), $248/cm^2$ ($1600/in^2$) to $550/cm^2$ ($3500/in^2$), or $248/cm^2$ ($1600/in^2$) to $394/cm^2$ ($2500/in^2$) may be useful, for example. Again, the spacing of the male fastening elements need not be uniform.

In some embodiments, stretching the thermoplastic film comprises adjusting a density of the male fastening elements to achieve a pre-determined density. The pre-determined density may be selected, based on a desired performance of the male fastening elements on the thermoplastic film. The desired performance can be a desired shear or peel strength to a fibrous substrate. The fibrous substrate can be a standard woven, nonwoven, or knit material or can be any fibrous substrate useful, for example, in an absorbent article.

As described above, when the thermoplastic layer includes a beta-nucleating agent, stretching the film provides micropores in at least a portion of the film. Without wanting to be bound by theory, it is believed that when the film is stretched in at least one direction, for example, the semi-crystalline polypropylene converts from the beta-crystalline structure to the alpha-crystalline structure in the film, and micropores are formed in the film. Male fastening elements are affected differently from the rest of the film. For example, male fastening elements (e.g., posts and caps) on a backing are typically not affected by the stretching or are affected to a much lesser extent than the backing and therefore retain beta-crystalline structure and generally have lower levels of microporosity than the backing. The resulting stretched thermoplastic layers can have several unique properties. For example, the micropores formed in the thermoplastic layer along with stress-whitening can provide an opaque, white film with transparent male fastening elements. When micropores are formed in the thermoplastic layer disclosed herein, the density of the film decreases. The resulting low-density thermoplastic layer feels softer to the touch than films having comparable thicknesses but higher densities. The density of the film can be measured using conventional methods, for example, using helium in a pycnometer. The softness of the film can be measured, for example, using Gurley stiffness. In some embodiments, stretching a thermoplastic layer with a first surface bearing male fastening elements that includes a beta-nucleating agent is carried out at temperature range from 50° C. to 110° C., 50° C. to 90° C., or 50° C. to 80° C. In some embodiments, stretching at lower temperatures may be possible, for example, in a range from 25° C. to 50° C. A thermoplastic layer with a first surface bearing male fastening elements that includes a beta-nucleating agent can typically be stretched at a temperature of up to 70° C. (e.g., in a range from 50° C. to 70° C. or 60° C. to 70° C.) and still successfully achieve microporosity.

It is often useful to laminate the thermoplastic layer to a substrate (e.g., even a sacrificial substrate) for ease of handling or for making a fastening laminate for a desired application. The thermoplastic layer may be laminated to the substrate using a variety of methods, for example, thermal bonding, adhesive bonding (e.g., with pressure sensitive adhesives), ultrasonic welding, laser welding, compression bonding, surface bonding, or combinations thereof. The thermoplastic layer may be joined to the substrate in a nip, or the laminate can be nipped downweb from where the thermoplastic layer is joined to the substrate.

Typically, the second surface of the thermoplastic layer (i.e., the surface opposite the first surface having the male fastening elements) is joined to the substrate. The substrate may be continuous (i.e., without any through-penetrating holes) or discontinuous (e.g. comprising through-penetrating perforations or pores). The substrate may comprise a variety of suitable materials including woven webs, non-woven webs, textiles, plastic films (e.g., single- or multi-layered films, coextruded films, laterally laminated films, or films comprising foam layers), and combinations thereof. The term "non-woven" refers to a material having a structure of individual fibers or threads that are interlaid but not in an identifiable manner such as in a knitted fabric. Examples of non-woven webs include spunbond webs, spunlaced webs, airlaid webs, meltblown web, and bonded carded webs. In some embodiments, the substrate is a fibrous material (e.g., a woven, nonwoven, or knit material). Useful fibrous materials may be made of natural fibers (e.g., wood or cotton fibers), synthetic fibers (e.g., thermoplastic fibers), or a combination of natural and synthetic fibers. Examples of suitable materials for forming thermoplastic fibers include polyolefins (e.g., polyethylene, polypropylene, polybutylene, ethylene copolymers, propylene copolymers, butylene copolymers, and copolymers and blends of these polymers), polyesters, and polyamides. The fibers may also be multi-component fibers, for example, having a core of one thermoplastic material and a sheath of another thermoplastic material. In some embodiments, the substrate comprises multiple layers of nonwoven materials with, for example, at least one layer of a meltblown nonwoven and at least one layer of a spunbonded nonwoven, or any other suitable combination of nonwoven materials. For example, the substrate may be a spunbond-meltbond-spunbond, spunbond-spunbond, or spunbond-spunbond-spunbond multi-layer material. Or, the substrate may be a composite web comprising a nonwoven layer and a dense film layer. A variety of combinations of film and nonwoven layers may be useful. Useful substrates may have any suitable basis weight or thickness that is desired for a particular application. For a fibrous substrate, the basis weight may range, e.g., from at least about 5, 8, 10, 20, 30, or 40 grams per square meter, up to about 400, 200, or 100 grams per square meter. The substrate may be up to about 5 mm, about 2 mm, or about 1 mm in thickness and/or at least about 0.1, about 0.2, or about 0.5 mm in thickness.

In a laminate made by the method of the present disclosure, the thermoplastic layer and the substrate may be substantially continuously bonded or intermittently bonded. "Substantially continuously bonded" refers to being bonded without interruption in space or pattern. Substantially continuously bonded laminates can be formed by passing the thermoplastic layer and the substrate between a heated smooth surfaced roll nip if at least one of them is thermally bondable or applying a substantially continuous adhesive coating or spray to one of the thermoplastic layer or substrate before bringing it in contact with the other of the thermoplastic layer or substrate. "Intermittently bonded" can mean not continuously bonded and refers to the thermoplastic layer and substrate being bonded to one another at discrete spaced apart points or being substantially unbonded to one another in discrete, spaced apart areas. Intermittently bonded laminates can be formed, for example, by ultrasonic point bonding, by passing the thermoplastic layer and the substrate through a heated patterned embossing roll nip if at least one of them is thermally bondable, or by applying discrete, spaced apart areas of adhesive to one of the thermoplastic layer or substrate before bringing it into contact with the other of the thermoplastic layer or substrate. An intermittently bonded laminate can also be made by feeding an adhesively coated apertured ply or scrim between the thermoplastic layer and the substrate.

When the thermoplastic layer includes microporosity that provides opacity in the thermoplastic layer, bonding the thermoplastic layer and the substrate using at least one of heat or pressure can collapse the microporous structure in the bond sites. The bond sites may be see-through regions of lower porosity that contrast with the surrounding opaque, microporous region. The term "see-through" refers to either transparent (that is, allowing passage of light and permitting a clear view of objects beyond) or translucent (that is, allowing passage of light and not permitting a clear view of objects beyond). The see-through region may be colored or colorless. It should be understood that a "see-through" region is large enough to be seen by the naked eye. The substrate may have a contrasting color from the thermoplastic layer that may be visible in the bond sites once the microporous structure is collapsed. Contrasting colors in the thermoplastic layer and the substrate may be provided by including a dye or a pigment in at least one of the thermoplastic layer or substrate. Bond sites made by at least one of heat or pressure can have a wide variety of geometric shapes, numbers, pictures, symbols, alphabetical letters, bar codes, or combinations thereof. The bond sites can also include a company name, brand name, or logo that may be readily identified by a customer. It is also possible that the microporous structure in a thermoplastic layer can be collapsed with at least one of heat or pressure before lamination. In this way the thermoplastic layer can be customized with a wide variety of geometric shapes, numbers, pictures, symbols, alphabetical letters, bar codes, or combinations thereof regardless of how it is laminated to the substrate.

In some embodiments of the method according to the present disclosure, the thermoplastic layer can be joined to a fibrous substrate using surface bonding or loft-retaining bonding techniques. The term "surface-bonded" when referring to the bonding of fibrous materials means that parts of fiber surfaces of at least portions of fibers are melt-bonded to the second surface of the thermoplastic layer, in such a manner as to substantially preserve the original (pre-bonded) shape of the second surface of the thermoplastic layer, and to substantially preserve at least some portions of the second surface of the thermoplastic layer in an exposed condition, in the surface-bonded area. Quantitatively, surface-bonded fibers may be distinguished from embedded fibers in that at least about 65% of the surface area of the surface-bonded fiber is visible above the second surface of the thermoplastic layer in the bonded portion of the fiber. Inspection from more than one angle may be necessary to visualize the entirety of the surface area of the fiber. The term "loft-retaining bond" when referring to the bonding of fibrous materials means a bonded fibrous material comprises a loft that is at least 80% of the loft exhibited by the material prior to, or in the absence of, the bonding process. The loft of a fibrous material as used herein is the ratio of the total volume occupied by the web (including fibers as well as interstitial spaces of the material that are not occupied by fibers) to the volume occupied by the material of the fibers alone. If only a portion of a fibrous substrate has the second surface of the thermoplastic layer bonded thereto, the retained loft can be easily ascertained by comparing the loft of the fibrous substrate in the bonded area to that of the web in an unbonded area. It may be convenient in some circumstances to compare the loft of the bonded substrate to that of a sample of the same substrate before being bonded, for example, if the entirety of fibrous substrate has the second surface of the thermoplastic layer bonded thereto. In some of these embodiments, the joining comprises impinging heated gaseous fluid (e.g., ambient air, dehumidified air, nitrogen, an inert gas, or other gas mixture) onto a first surface of the fibrous substrate web while it is moving; impinging heated fluid onto the second surface of the thermoplastic layer while the continuous web is moving, wherein the second surface is opposite the male fastening elements on the thermoplastic layer; and contacting the first surface of the fibrous substrate web with the second surface of the thermoplastic layer so that the first surface of the fibrous substrate web is melt-bonded (e.g., surface-bonded or bonded with a loft-retaining bond) to the second surface of the thermoplastic layer. Impinging heated gaseous fluid onto the first surface of the fibrous substrate web and impinging heated gaseous fluid on the second surface of the thermoplastic layer may be carried out sequentially or simultaneously. Further methods and apparatus for joining a continuous thermoplastic web to a fibrous substrater web using heated gaseous fluid may be found in U.S. Pat. Appl. Pub. Nos. 2011/0151171 (Biegler et al.) and 2011/0147475 (Biegler et al.).

In some embodiments, the substrate may be extensible but non-elastic. In other words, the substrate may have an elongation of at least 5, 10, 15, 20, 25, 30, 40, or 50 percent but substantially no recovery from the elongation (e.g., up to 40, 25, 20, 10, or 5 percent recovery). The term "extensible" refers to a material that can be extended or elongated in the direction of an applied stretching force without destroying the structure of the material or material fibers. In some embodiments, an extensible substrate may be stretched to a length that is at least about 5, 10, 15, 20, 25, or 50 percent greater than its relaxed length without destroying the structure of the material or material fibers. Suitable extensible carriers may include nonwovens (e.g., spunbond, spunbond meltblown spunbond, or carded nonwovens). In some embodiments, the nonwoven may be a high elongation carded nonwoven (e.g., HEC). Other extensible, non-elastic carriers include thermoplastic films, including those made from any of the materials described above for the thermoplastic layer. The extensible, non-elastic film may be thinner than the thermoplastic layer in some embodiments.

In some embodiments of the method according to the present disclosure, the substrate comprises an elastic material. The term "elastic" refers to any material (such as a film that is 0.002 mm to 0.5 mm thick) that exhibits recovery from stretching or deformation. An elastic material is an extensible material that has recovery properties. In some embodiments, a material may be considered to be elastic if, upon application of a stretching force, it can be stretched to a length that is at least about 25 (in some embodiments, 50) percent larger than its initial length and can recover at least 40, 50, 60, 70, 80, or 90 percent of its elongation upon release of the stretching force. An elastic substrate may be a film or fibrous. Examples of polymers for making elastic films or fibrous carriers include thermoplastic elastomers such as ABA block copolymers, polyurethane elastomers, polyolefin elastomers (e.g., metallocene polyolefin elastomers), olefin block copolymers, polyamide elastomers, ethylene vinyl acetate elastomers, and polyester elastomers. An ABA block copolymer elastomer generally is one where the A blocks are polystyrenic, and the B blocks are prepared from conjugated dienes (e.g., lower alkylene dienes). The A block is generally formed predominantly of substituted (e.g., alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a more tacky elastomeric film segment. Other elastic polymers can be blended with block copolymer elastomers, and various elastic polymers may be blended to have varying degrees of elastic properties.

Many types of thermoplastic elastomers are commercially available, including those from BASF, Florham Park, N.J., under the trade designation "STYROFLEX", from Kraton Polymers, Houston, Tex., under the trade designation "KRATON", from Dow Chemical, Midland, Mich., under the trade designation "PELLETHANE", "INFUSE", VERSIFY", or "NORDEL", from DSM, Heerlen, Netherlands, under the trade designation "ARNITEL", from E. I. duPont de Nemours and Company, Wilmington, Del., under the trade designation "HYTREL", from ExxonMobil, Irving, Tex. under the trade designation "VISTAMAXX", and more.

An elastic film substrate may have a single layer of an elastomer, or the substrate may have a core made with an elastomer and at least one skin layer from a relatively non-elastic polymer, such as any of those described above for the thermoplastic layer. The materials and thicknesses of the multi-layer elastic substrate may be selected such that when the substrate is extended to a certain degree, the skin layers undergo plastic deformation. When the elastic layer recovers, the relatively non-elastic skin layer forms a textured surface on the elastic core. Such elastic films are described, for example, in U.S. Pat. No. 5,691,034 (Krueger et al.).

In some embodiments, at least the portion of the substrate joined to the thermoplastic layer is generally not extensible. In some of these embodiments, the portion of substrate joined to the thermoplastic layer will have up to a 10 (in some embodiments, up to 9, 8, 7, 6, or 5) percent elongation in the MD or CD. In some embodiments, the substrate is not pleated. In other embodiments of the laminate made by the method of the present disclosure, one or more zones of the substrate may comprise one or more elastically extensible materials extending in at least one direction when a force is applied and returning to approximately their original dimension after the force is removed.

Curl and wrinkling are common problems observed when two dissimilar materials are laminated together. In order to laminate two dissimilar materials together without curl or wrinkling, the two materials can be laminated together with matched strains. In a traditional hook laminate process where a hook is laminated to a substrate made from a dissimilar material, this is relatively simple since the tension required to handle the hook and substrate is typically well below the yield stress of the materials. As a result, the strains of the two materials are typically easy to predict and match by simply tweaking the tensions of the two materials up or down relative to the other when laminating.

In some embodiments, it is useful to laminate a stretched thermoplastic layer bearing male fastening elements to a substrate immediate after stretching. The substrate can be useful to support the film and allow for improved handling. With the support of the substrate, it can be possible to use thermoplastic layers that have been stretched with a higher stretch ratio than if the thermoplastic layer was stretched, wound up on a roll, and stored before lamination and incorporation into a final product construction.

We have found that including a stretching operation immediately preceding lamination adds new complexity to the problem of laminating dissimilar materials. Upon stretching a thermoplastic layer, the material properties of the thermoplastic layer change, and there are residual stresses in the thermoplastic layer. When the thermoplastic layer with these residual stresses is immediately laminated to a substrate without consideration of the new material properties, the finished laminate may curl or wrinkle due to a mismatch in strain and/or tension of the thermoplastic layer and substrate. Matching the strain of the stretched thermoplastic layer and the substrate at the lamination point becomes much more challenging since the thermoplastic layer is generally stretched beyond its yield strength where the amount of strain recovery is much less predictable and more difficult to control.

Figure 4:
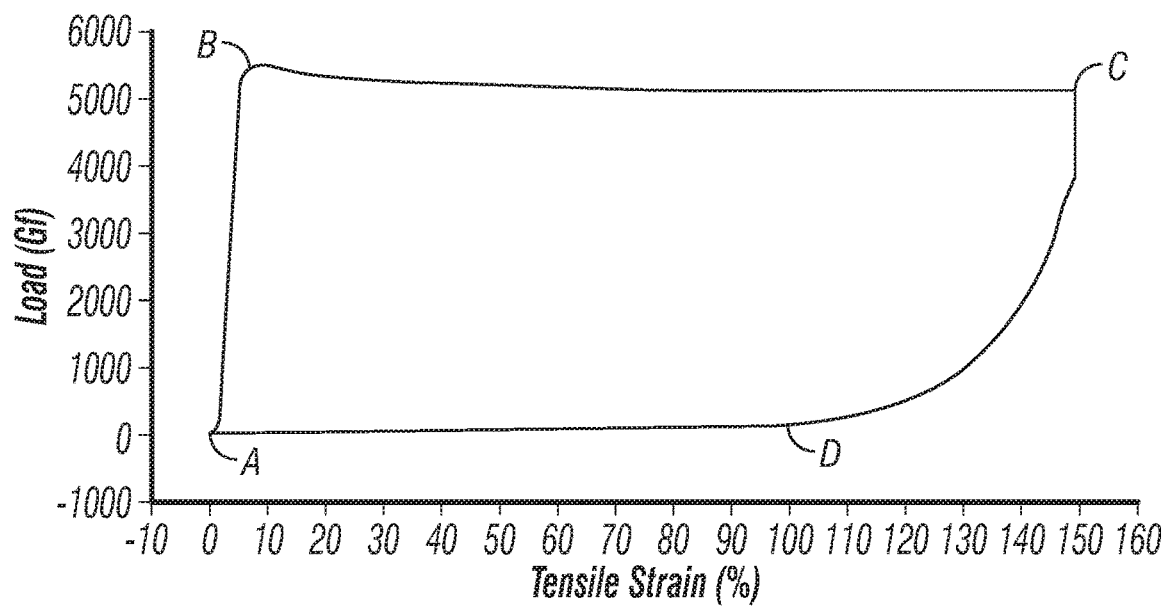
FIG. 4 is a graph of a one-cycle hysteresis evaluation of a propylene thermoplastic layer having a plurality of male fastening elements on one surface.

FIG. 4 is a graph of a one-cycle hysteresis room temperature-evaluation to 150% tensile strain of a 30 millimeter (mm)-wide beta-phase polypropylene thermoplastic layer having a basis weight of 75 grams per square meter (gsm). The thermoplastic layer has first and second opposing surfaces with a plurality of male fastening elements on the first surface. Beta-phase polypropylene is one example of a thermoplastic that can be useful in the method disclosed herein and will be described in further detail below. Point A is the zero tension, zero elongation starting point of the evaluation. As the evaluation begins, the thermoplastic layer stretches and elastically deforms between points A and B. At point B the thermoplastic layer begins to yield and then continues to stretch to 150% elongation or tensile strain (point C in FIG. 4). After reaching 150% elongation, the thermoplastic layer begins to retract. On the way back to 0% elongation, the thermoplastic layer reaches zero tension at around 100% elongation (point D). The position of point D may change depending on the extent of elongation (point C) of the thermoplastic layer.

In a traditional process for laminating a thermoplastic mechanical fastener to a substrate, both the mechanical fastener and the substrate are processed with tensions between points A and B (elastic zone). If a thermoplastic mechanical fastener was stretched in the machine direction immediately before being laminated to a carrier at point C, the thermoplastic mechanical fastener would essentially be laminated at around a 50% tensile strain (beyond point D at zero tension). In order to match the strain of the thermoplastic mechanical fastener (e.g., to eliminate curl), the substrate would have to elongate by the same amount, but traditional substrates for mechanical fastening laminates (e.g., tape or nonwovens) would typically break well before reaching 50% elongation.

Figure 5:
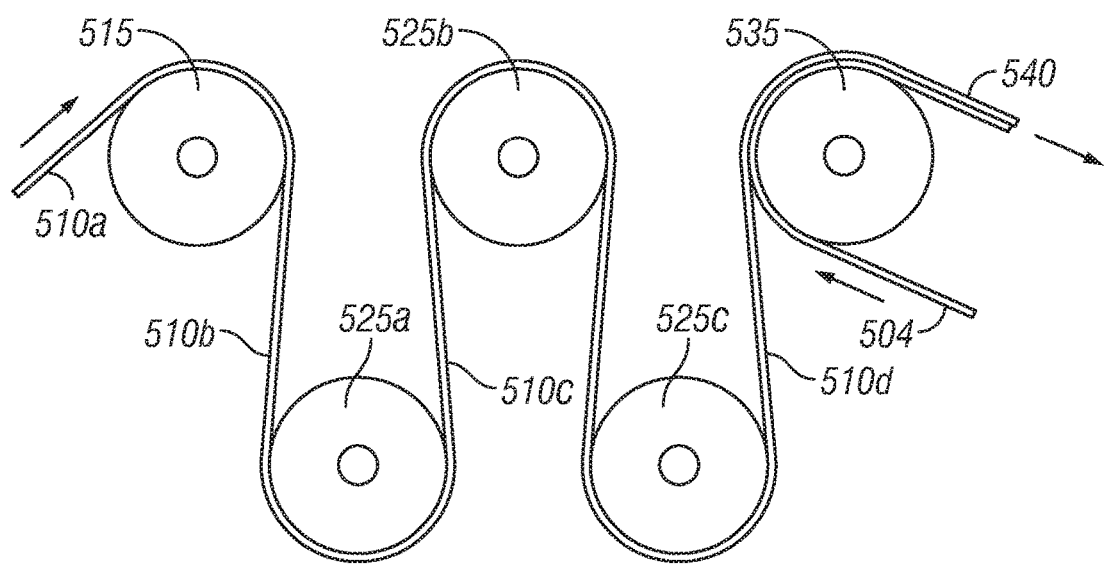
FIG. 5 is a diagrammatical view of an embodiment of a method of making a laminate according to the present disclosure.

FIG. 5 illustrates an embodiment of a method according to the present disclosure in which the thermoplastic layer is stretched in the machine direction and then relaxed before being laminated to a substrate 504. The stretch-and-relax method is accomplished by rolls of different speeds. In the illustrated embodiment, roller 525a is set at a faster speed than roller 515, stretching the thermoplastic layer 510a a certain amount. The resulting stretched mechanical fastener 510b can be stretched further by roller 525b, set at a faster speed than roller 525a. Again, the resulting stretched mechanical fastener 510c can be stretched further by roller 525c, set at a faster speed than roller 525b. Finally, roller 535 is set at a slower speed than roller 525c, causing the stretched mechanical fastener 510c to relax. The stretched and relaxed mechanical fastener 510d is then laminated to the carrier 504 to provide laminate 540. Rollers 525a, 525b, and 525c can be set at any progressively faster speeds that would cause the thermoplastic layer 510a to stretch a desired amount at each stage. For example, the first roller 515 would be set at a speed of 1.0×, and the second rollers 525a, 525b, and 525c could be set at speeds of 1.5×, 2.0×, and 2.5×, respectively. The third roller 535 can be set to whatever speed is needed in order to sufficiently relax the stretched mechanical fastener 510c a desired amount. For example, in the example above in which the second roller 525c is set at a speed of 2.5×, the third roller 535 may be set at a speed of 2.25×, 2.0×, 1.75×, 1.5×, or 1.25×. Stretching the thermoplastic layers incrementally between rollers of progressively faster speeds may be useful, for example, for allowing faster line speeds, providing more consistent stretch, and allowing for higher stretch ratios in the method of making laminate 540. This type of stepwise stretching can also be used in the stretching operation shown in FIG. 3, where relaxing the stretched mechanical fastener may or may not be used. In other embodiments, stretching and relaxing the thermoplastic layer 510a can be accomplished with a single roll in place of the three rolls 525a, 525b, and 525c. In these cases, the desired amount of stretch is provided by one roll.

In another embodiment of the method shown in FIG. 5, thermoplastic layer 510a is stretched and relaxed multiple times before being laminated to carrier 504. For example, second roller 525a is set at a faster speed than first roller 515, stretching the thermoplastic layer 510a a certain amount. Roller 525b is set at a slower speed than second roller 525a, causing the resulting stretched mechanical fastener 510b to relax. The stretched and relaxed mechanical fastener 510c is stretched further by roller 525c, which is set at a faster speed than roller second roller 525a and roller 525b. Finally, roller 535 is set at a slower speed than roller 525c, causing the stretched mechanical fastener 510c to relax. The stretched and relaxed mechanical fastener 510d is then laminated to the carrier 504 to provide laminate 540. The rollers can be set at any speed sufficient to stretch or relax the thermoplastic layer 510a a desired amount at each stage. For example, the first roller 515 would be set at a speed of 1.0×, and, in some embodiments, the second roller 525a is set at a speed of 2.0×. Then, the roller 525b can be set at a speed of 1.5×, and the roller 525c can be set to a speed of 2.5×. Finally, the roller 535 can be set at a speed of 2.0×.

Figure 6:
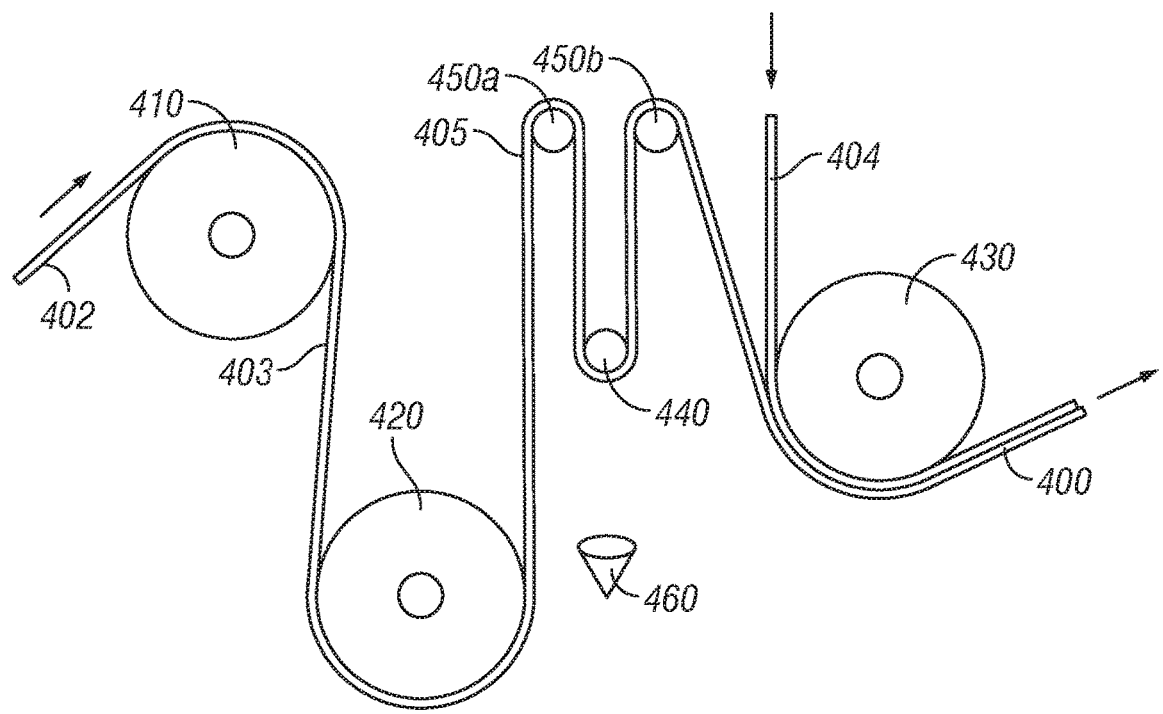
FIG. 6 is a diagrammatical view of another embodiment of a method of making a laminate according to the present disclosure.

FIG. 6 illustrates another embodiment of the method according to the present disclosure in which the thermoplastic layer is stretched with two different speed rolls, and when it is relaxed, the tension in the stretched thermoplastic layer is controlled by a dancer. This embodiment may be more complex than the previously described embodiments, but could provide additional control handles that may be helpful. In the embodiment illustrated in FIG. 6, second roller 420 is set at a faster speed than first roller 410, causing the thermoplastic layer 402 to become stretched. The speed of the third roller 430 is controlled by keeping the dancer 440 steady using eye 460. Stretched thermoplastic layer 403 passes through a dancer station that includes guide rolls 450a and 450b and dancer 440. The eye 460 adjusts the speed of the third roller 430 to a slower speed than roller 420, causing the stretched thermoplastic layer 403 to relax. The stretched and relaxed thermoplastic layer 405 is then laminated to the substrate 404 to provide laminate 400. Second roller 420 can be set at any speed that would cause the thermoplastic layer 402 to stretch a desired amount. For example, the first roller 410 would be set to 1.0×, and the second roller 420 would be set to some speed higher than the final desired stretch ratio of the thermoplastic layer. For example if a final stretch of 2.0× was desired, the second roller 420 may be set to 2.5× so when the stretched thermoplastic layer 403 relaxes to the tension in the dancer 440, the final stretch ratio in the stretched and relaxed thermoplastic layer will be close to 2.0×. The embodiment shown in FIG. 6 can be combined with the embodiments shown in FIG. 5, in which the thermoplastic layer is stretched in a stepped format or cyclical format, respectively. The embodiments illustrated in FIGS. 5 and 6 can be combined with the methods illustrated in FIGS. 2 and 3 such that slitting, stretching, relaxing, and laminating are all carried out in-line.

The method according to the present disclosure includes relaxing the stretched thermoplastic layer to reduce its tensile strain. It may be desirable to make the tensile strain of the thermoplastic layer similar to the tensile strain on the substrate. This may be accomplished by stretching the thermoplastic layer beyond the desired tension strain for lamination, which may be an elongation of 100%, 125%, 150%, 175%, 200%, or more. In some embodiments, the thermoplastic layer is stretched at least 20%, 30%, 40%, or 50% beyond the desired tensile strain for lamination and then to relax to the desired tensile strain.

Figure 7:
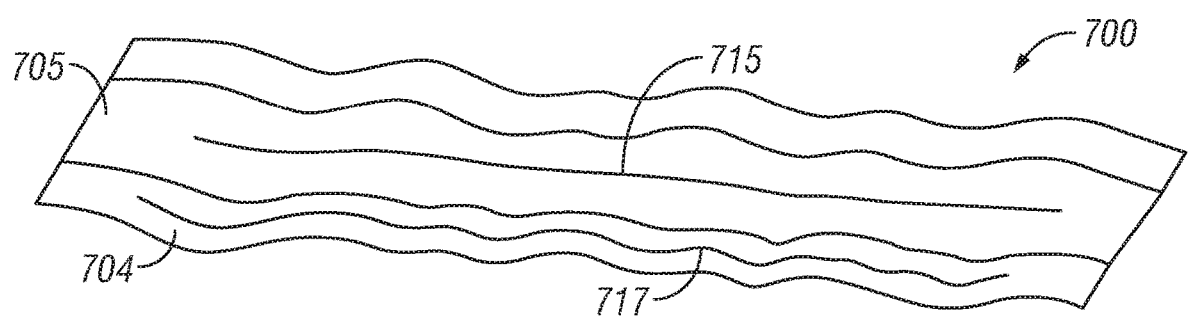
FIG. 7 is a diagram of a laminate have two lines superimposed on it for calculating curl in the laminate as described in the Examples.

In some embodiments, the tensile strain of the stretched thermoplastic layer is reduced to an amount sufficient to prevent curling of the laminate. Curling can be measured using the following test method. A strip is cut from the roll of the laminate and placed on a table using tape on each cut end to secure it to the table. The sample is then scanned, and software is then used to convert the point cloud to a stl file and import it into CAD software to create a 3D surface profile of the sample. Two straight lines with identical end point positions are then projected onto the laminate with the lines running parallel to the sample. A diagram of the two lines on the laminate is illustrated in FIG. 7. One line 715 is positioned on the laminate 700 over the thermoplastic layer 705. The other line 717 is position 0.635 cm beyond the edge of the thermoplastic layer 705 on the substrate 704. Then the total path length of both lines are measured, and the difference between the two path lengths are calculated. Further details are provided in the Examples, below. In some embodiments, the difference between the two path lengths is less than 2% or less than 1%. In general, when the difference between the two path lengths is less than 1%, the laminate is not visibly curled.

Further information about stretching, relaxing, and laminating a thermoplastic layer in-line are described in U.S. Pat. App. Ser. No. 62/270,381 (Gilbert et al.), incorporated herein by reference.

The laminate made by the method of the present disclosure can be cut in the cross-machine direction, for example, to provide a patch of any desired size for a given application. Such a patch can be considered a fastening patch.

Figure 8:
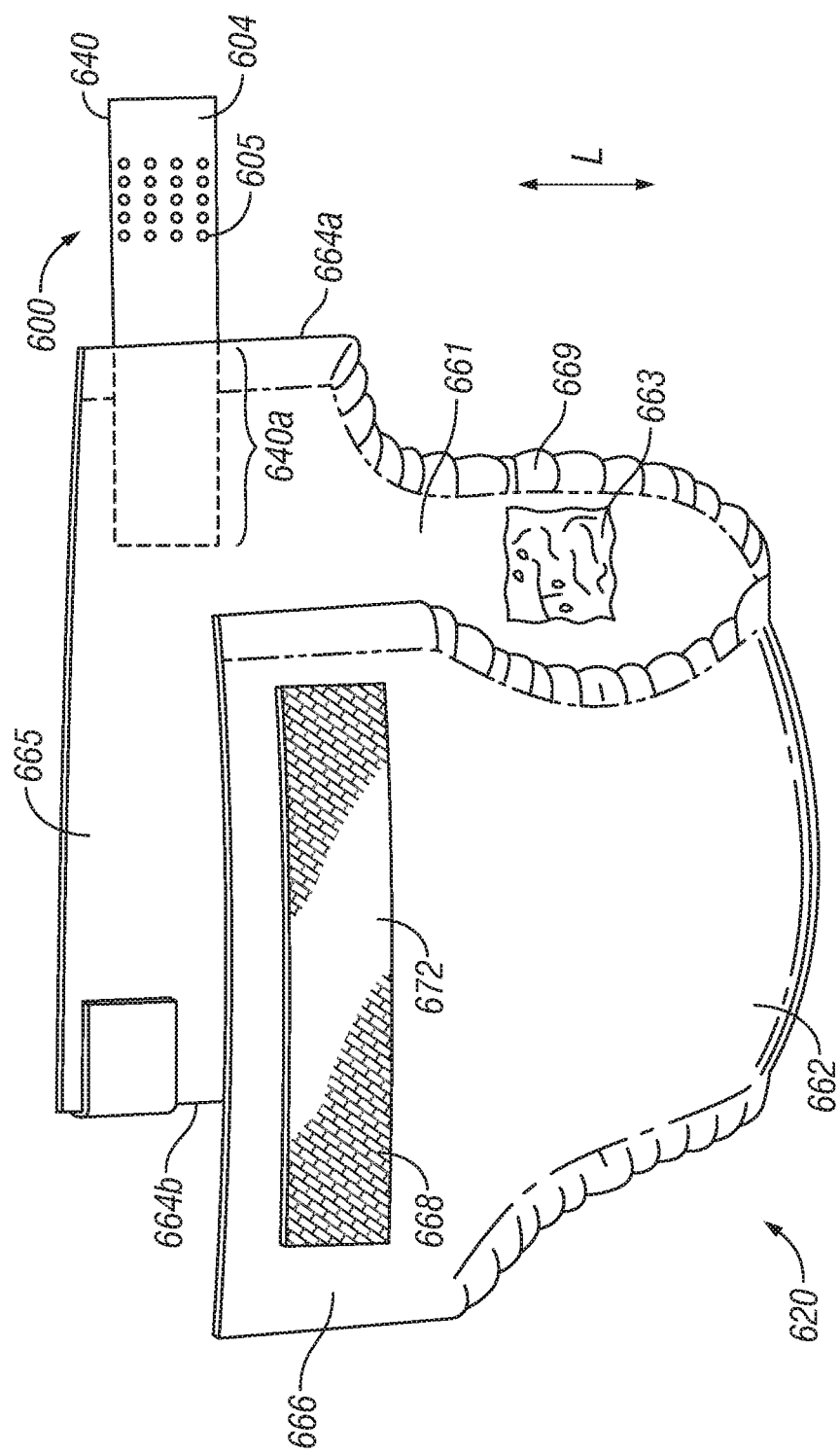
FIG. 8 is a perspective view of a diaper including a laminate according to the present disclosure and/or made by the method of the present disclosure.

Laminates made according the method of the present disclosure are useful, for example, in absorbent articles. In some embodiments, the substrate is a component of an absorbent article (e.g., a diaper or adult incontinence article). The component of the absorbent article can be, for example, a fastening tab or a diaper ear. A schematic, perspective view of one embodiment of an absorbent article 620 that can include a laminate made according to the present disclosure is shown in FIG. 8. Absorbent article 620 includes a chassis with a topsheet side 661 and a backsheet side 662. The chassis also has first and second opposing longitudinal edges 664a and 664b extending from a rear waist region 665 to an opposing front waist region 666. The longitudinal direction of the absorbent article 660 refers to the direction "L" extending between the rear waist region 665 and the front waist region 666. Therefore, the term "longitudinal" refers to the length of the absorbent article 660, for example, when it is in an open configuration. The absorbent article 620 has an absorbent core 663 between the topsheet and the backsheet and an elastic material 669 along at least a portion of longitudinal edges 664a and 664b to provide leg cuffs.

At least one of the front waist region 666 or the rear waist region 665, more typically the rear waist region 665, comprises at least one fastening tab 640 according to the present disclosure and/or made by a method according to the present disclosure. Laminate 600 includes a nonwoven fabric substrate 604 and a thermoplastic layer 605 that has been stretched, useful as a mechanical fastener. An end 640a of the laminate 600 is bonded to the first longitudinal edge 664a of the chassis in the rear waist region 665 using adhesive (not shown). In the illustrated embodiment, the nonwoven fabric substrate 604 at the user's end of the fastening tab exceeds the extension of the thermoplastic layer 605 thereby providing a fingerlift. Fastening tab 640 furthermore optionally comprises release tape (not shown) to contact any exposed part of adhesive that may be present on the fastening tab. The release tape may be joined to the diaper rear waist region 665 using adhesive. Many configurations of release tape are possible depending on the configuration of the attachment of the fastening tab 640 to diaper 620.

In some embodiments, when attaching the absorbent article 620 to a wearer's body, the user's end of fastening tab can be attached to a target area 668 comprising fibrous material 672 which may be arranged on the back sheet 662 of the front waist region 666. Examples of loop tapes which may be applied to the target area 668 to provide an exposed fibrous material 672 are disclosed, for example, in U.S. Pat. No. 5,389,416 (Mody et al.) EP 0,341,993 (Gorman et al.) and EP 0,539,504 (Becker et al.). In other embodiments, the back sheet 662 comprises a woven or nonwoven fibrous layer which is capable of interacting with the thermoplastic layer 605 disclosed herein, which has male fastening elements on its first surface. Examples of such back sheets 662 are disclosed, for example, in U.S. Pat. No. 6,190,758 (Stopper) and U.S. Pat. No. 6,075,179 (McCormack et al.). In other embodiments, the size of the target area 668 may be smaller, may be in the form of two separate portions near the first and second longitudinal edges 664a, 664b.

While in the illustrated embodiment, the laminate is included in a fastening tab, in other embodiments, the laminate may be an integral ear portion of the absorbent article. The laminate made by the method according to the present disclosure may also be useful, for example, for disposable articles such as sanitary napkins. Laminates made by a method of the present disclosure may also be useful in many other fastening applications, for example, assembly of automotive parts or any other application in which releasable attachment may be desirable.

The methods according to the present disclosure can be useful for making fastening tabs, for example, having multiple, narrow mechanical fastener strips side-by-side. In these embodiments, the article or fastening tab according to the present disclosure can have multiple thermoplastic strips having opposing side edges and bearing a plurality of male fastening elements arranged side-by-side, wherein a distance between the side edges is up to 10, 8, 6, 4, or 2 millimeters. In the methods where multiple thermoplastic layers remain attached to a wider web, it may be possible to go without any guides for the narrows strips before they are laminated to a substrate, for example, since the narrow strips will separate from each other due to necking during the stretching.

While in many embodiments, the thermoplastic layer in the methods and articles according to the present disclosure do not have holes therethrough, the methods according to the present disclosure can also be useful for making a thermoplastic layer having openings therein. An embodiment is shown in FIG. 9. FIG. 9 illustrates an example of a portion of a thermoplastic layer and a method for making it. In FIG. 9, slit 920a is used to prepare thermoplastic film 911, which has a width between 10 mm and 50 mm, for example. Also, thermoplastic layer 911a is provided with a first plurality of slits 920 aligned in the machine direction. Stretching in the machine direction can be carried out, for example, (shown by the arrow in FIG. 1) using any of the methods described above. FIG. 9 illustrates the effect of stretching the slit thermoplastic web in the direction of the slits, which in the illustrated embodiment is the machine direction. When the thermoplastic film 911 is stretched, necking-in occurs to provide stretched thermoplastic layer 910. Also when the thermoplastic film 911 is stretched, necking-in occurs at the at portions 926 of the thermoplastic layer between the slits, and the necking-in of these portions 926 creates elongated openings 924 in thermoplastic layer 910a. Thermoplastic layers 910 and 910a can then be laminated to a substrate in-line, if desired, after annealing or relaxation of the thermoplastic layer as described above. Further information about mechanical fasteners having a plurality of machine-direction aligned openings prepared by slitting and stretching a thermoplastic layer are described in U.S. Pat. App. Ser. No. 62/270,399 (Gilbert et al.), incorporated herein by reference.

Some Embodiments of the Disclosure

In a first embodiment, the present disclosure provides an article comprising:

a thermoplastic layer having opposing first and second side edges and first and second surfaces, the first surface of the thermoplastic layer bearing a plurality of male fastening elements, wherein the thermoplastic layer is plastically deformed and has a retardance profile extending between the first and second side edges that drops off appreciably near at least one of the first or second edge to create an edge effect, wherein a distance between the first and second side edges is up to 50 millimeters. The edge effect can be described as a retardance profile in which there is an average retardance along a perpendicular line from the first edge to a location 500 micrometers from the first edge, and a distance from the first edge where 75% of the average retardance is observed is at least 10 micrometers. In general, there is also an average retardance along a perpendicular line from the second edge to a location 500 micrometers from the second edge, and a distance from the second edge where 75% of the average retardance is observed is at least 10 micrometers.

In a second embodiment, the present disclosure provides the article of the first embodiment, wherein a distance from at least one of the first edge or the second edge where 75% of the average retardance is observed is at least 15 micrometers.

In a third embodiment, the present disclosure provides the article of the first or second embodiment, wherein the distance between the opposing first and second side edges is at least ten millimeters.

In a fourth embodiment, the present disclosure provides the article of any one of the first to third embodiments, wherein the thermoplastic layer has no through-holes.

In a fifth embodiment, the present disclosure provides the article of any one of the first to fourth embodiments, wherein the thermoplastic layer is substantially planar.

In a sixth embodiment, the present disclosure provides the article of any one of the first to fifth embodiments, wherein the thermoplastic layer has an average thickness of up to 75 µm.

In a seventh embodiment, the present disclosure provides the article of any one of the first to sixth embodiments, wherein the thermoplastic layer comprises at least one of a polyolefin, polyamide, or polyester.

In an eighth embodiment, the present disclosure provides the article of the seventh embodiment, wherein the thermoplastic layer comprises at least one of polypropylene or polyethylene.

In a ninth embodiment, the present disclosure provides the article of the eighth embodiment, wherein the thermoplastic layer comprises beta-phase polypropylene.

In a tenth embodiment, the present disclosure provides the article of any one of the first to ninth embodiments, wherein the second surface of the thermoplastic layer is free of male fastening elements.

In an eleventh embodiment, the present disclosure provides the article of any one of the first to tenth embodiments, wherein there are multiple rows of the male fastening elements between the opposing first and second side edges of the thermoplastic layer.

In a twelfth embodiment, the present disclosure provides the article of any one of the first to eleventh embodiments, further comprising a substrate laminated to the second surface of the thermoplastic layer.

In a thirteenth embodiment, the present disclosure provides an article comprising:
a substrate; and
a thermoplastic layer joined to the substrate,
the thermoplastic layer having opposing first and second side edges and first and second surfaces, the first surface of the thermoplastic layer bearing a plurality of male fastening elements, wherein the thermoplastic layer is plastically deformed and has a retardance profile comprising an average retardance along a line from the first edge to a location 500 micrometers from the first edge, wherein a distance from the first edge where 75% of the average retardance is observed is at least 10 micrometers,
wherein the article is a fastening tab.

In general, there is also an average retardance along a line from the second edge to a location 500 micrometers from the second edge, and a distance from the second edge where 75% of the average retardance is observed is at least 10 micrometers.

In a fourteenth embodiment, the present disclosure provides the article of the thirteenth embodiment, wherein a distance from at least one of the first or second edge where 75% of the average retardance is observed is at least 15 micrometers.

In a fifteenth embodiment, the present disclosure provides the article of the thirteenth or fourteenth embodiment, wherein the distance between the opposing first and second side edges is at least ten millimeters and up to 50 millimeters.

In a sixteenth embodiment, the present disclosure provides the article of any one of the thirteenth to fifteenth embodiments, wherein the thermoplastic layer has no through-holes.

In a seventeenth embodiment, the present disclosure provides the article of any one of the thirteenth to sixteenth embodiments, wherein the thermoplastic layer is substantially planar.

In an eighteenth embodiment, the present disclosure provides the article of any one of the thirteenth to seventeenth embodiments, wherein the thermoplastic layer has an average thickness of up to 75 µm.

In a nineteenth embodiment, the present disclosure provides the article of any one of the thirteenth to eighteenth embodiments, wherein the thermoplastic layer comprises at least one of a polyolefin, polyamide, or polyester.

In a twentieth embodiment, the present disclosure provides the article of the nineteenth embodiment, wherein the thermoplastic layer comprises at least one of polypropylene or polyethylene.

In a twenty-first embodiment, the present disclosure provides the article of the twentieth embodiment, wherein the thermoplastic layer comprises beta-phase polypropylene.

In a twenty-second embodiment, the present disclosure provides the article of any one of the thirteenth to twenty-first embodiments, wherein the second surface of the thermoplastic layer is free of male fastening elements.

In a twenty-third embodiment, the present disclosure provides the article of any one of the thirteenth to twenty-second embodiments, wherein there are multiple rows of the male fastening elements between the opposing first and second side edges of the thermoplastic layer.

In a twenty-fourth embodiment, the present disclosure provides the article any one of the twelfth to twenty-second embodiments, wherein the substrate comprises at least one of a nonwoven material, a knit material, or a film.

In a twenty-fifth embodiment, the present disclosure provides the article any one of the twelfth to twenty-fourth embodiments, wherein the substrate comprises an elastic material.

In a twenty-sixth embodiment, the present disclosure provides the article of any one of the twelfth to twenty-fifth embodiments, wherein the substrate is a component of a personal care product.

In a twenty-seventh embodiment, the present disclosure provides a method of making the article of any one of the first to twenty-sixth embodiments, the method comprising:
providing a thermoplastic film having a first surface extending between opposing first and second side edges with a distance between the opposing first and second side edges of up to 50 millimeters, the first surface of the thermoplastic film bearing a plurality of male fastening elements; and
stretching the thermoplastic film to form the thermoplastic layer wherein the thermoplastic layer is plastically deformed.

In a twenty-eighth embodiment, the present disclosure provides a method of making an article comprising a thermoplastic layer, the method comprising:
providing a thermoplastic film having a first surface extending between opposing first and second side edges with a distance between the opposing first and second side edges of up to 50 millimeters, the first surface of the thermoplastic film bearing a plurality of male fastening elements; and stretching the thermoplastic film to form the thermoplastic layer wherein the thermoplastic layer is plastically deformed.

In a twenty-ninth embodiment, the present disclosure provides the method of the twenty-eighth embodiment, wherein the distance between the first and second side edges is at least ten millimeters.

In a thirtieth embodiment, the present disclosure provides the method of the twenty-eighth or twenty-ninth embodiment, wherein the thermoplastic layer has no through-holes.

In a thirty-first embodiment, the present disclosure provides the method of any one of the twenty-eighth to thirtieth embodiments, wherein the thermoplastic film is substantially planar.

In a thirty-second embodiment, the present disclosure provides the method of any one of the twenty-eighth to thirty-first embodiments, wherein the thermoplastic film comprises at least one of a polyolefin, polyamide, or polyester.

In a thirty-third embodiment, the present disclosure provides the method of the thirty-second embodiment, wherein the thermoplastic film comprises at least one of polypropylene or polyethylene.

In a thirty-fourth embodiment, the present disclosure provides the method of the thirty-third embodiment, wherein the thermoplastic film comprises beta-phase polypropylene.

In a thirty-fifth embodiment, the present disclosure provides the method of any one of the twenty-eighth to thirty-fourth embodiments, wherein the second surface of the thermoplastic film is free of male fastening elements.

In a thirty-sixth embodiment, the present disclosure provides the method of any one of the twenty-eighth to thirty-fifth embodiments, wherein there are multiple rows of the male fastening elements between the first and second side edges of the thermoplastic layer.

In a thirty-seventh embodiment, the present disclosure provides the method of any one of the twenty-seventh to thirty-sixth embodiments, wherein the thermoplastic film is stretched monoaxially in the machine direction.

In a thirty-eighth embodiment, the present disclosure provides the method of the thirty-seventh embodiment, wherein the thermoplastic film is stretched in the machine direction by differential speed rolls.

In a thirty-ninth embodiment, the present disclosure provides the method of any one of the twenty-seventh to thirty-sixth embodiments, wherein the thermoplastic film is stretched in both the machine direction and cross-direction.

In a fortieth embodiment, the present disclosure provides the method of any one of the twenty-seventh to thirty-ninth embodiments, wherein stretching the thermoplastic film so that it plastically deforms comprises stretching to at least 20% elongation.

In a forty-first embodiment, the present disclosure provides the method of any one of the twenty-seventh to fortieth embodiments, wherein stretching the thermoplastic film so that it plastically deforms comprises stretching to at least 25% elongation.

In a forty-second embodiment, the present disclosure provides the method of any one of the twenty-seventh to forty-first embodiments, wherein stretching the thermoplastic film so that it plastically deforms comprises stretching to at least 30% elongation.

In a forty-third embodiment, the present disclosure provides the method of any one of the twenty-seventh to forty-second embodiments, wherein stretching the thermoplastic film so that it plastically deforms comprises stretching to at least 50% elongation.

In a forty-fourth embodiment, the present disclosure provides the method of any one of the twenty-seventh to forty-third embodiments, wherein the thermoplastic layer is stretched by 1.25× to 5× in at least one direction.

In a forty-fifth embodiment, the present disclosure provides the method of any one of the twenty-seventh to forty-fourth embodiments, wherein the thermoplastic layer is stretched by 1.5× to 4× in at least one direction.

In a forty-sixth embodiment, the present disclosure provides the method of any one of the twenty-seventh to forty-fifth embodiments, wherein a density of the male fastening elements before stretching is in a range from 394/cm$^2$ (2500/in$^2$) to 1575/cm$^2$ (10000/in$^2$).

In a forty-seventh embodiment, the present disclosure provides the method of any one of the twenty-seventh to forty-sixth embodiments, wherein a density of the male fastening elements after stretching is in a range from 248/cm$^2$ (1600/in$^2$) to 550/cm$^2$ (3500/in$^2$).

In a forty-eighth embodiment, the present disclosure provides the method of any one of the twenty-seventh to forty-seventh embodiments, wherein stretching the thermoplastic film comprises adjusting a density of the male fastening elements to achieve a pre-determined density.

In a forty-ninth embodiment, the present disclosure provides the method of the forty-eighth embodiment, wherein the pre-determined density is selected based on a desired shear or peel strength to a fibrous substrate.

In a fiftieth embodiment, the present disclosure provides the method of any one of the twenty-seventh to forty-ninth embodiments, wherein after stretching, the thermoplastic layer has an average thickness of up to 75 micrometers.

In a fifty-first embodiment, the present disclosure provides the method of the fiftieth embodiment, wherein after stretching, the average thickness of the thermoplastic layer is up to 50 micrometers.

In a fifty-second embodiment, the present disclosure provides the method of any one of the twenty-seventh to fifty-first embodiments, wherein providing the thermoplastic film comprises unwinding the thermoplastic film from a roll.

In a fifty-third embodiment, the present disclosure provides the method of any one of the twenty-seventh to fifty-second embodiments, wherein providing the thermoplastic film comprises providing a wide thermoplastic web having a first surface bearing a plurality of the male fastening elements, the wide thermoplastic web having a width at least twice the distance between the opposing first and second side edges of the thermoplastic film, the method further comprising slitting the wide thermoplastic web to form at least two of the thermoplastic films.

In a fifty-fourth embodiment, the present disclosure provides the method of the fifty-third embodiment, wherein the at least two of the thermoplastic films are stretched simultaneously.

In a fifty-fifth embodiment, the present disclosure provides the method of the fifty-third or fifty-fourth embodiment, wherein the at least two of the thermoplastic films remain connected to the wide thermoplastic web during at least a portion of the stretching.

In a fifty-sixth embodiment, the present disclosure provides the method of any one of the fifty-third to fifty-fifth embodiments, wherein slitting the wide thermoplastic web and stretching the at least two of the thermoplastic films is carried out in-line.

In a fifty-seventh embodiment, the present disclosure provides the method of any one of the twenty-seventh to fifty-sixth embodiments, further comprising heating the thermoplastic film before stretching, while stretching, or a combination thereof.

In a fifty-eighth embodiment, the present disclosure provides the method of any one of the twenty-seventh to fifty-seventh embodiments, further comprising laminating the second surface of the thermoplastic layer to a substrate.

In a fifty-ninth embodiment, the present disclosure provides the method of the fifty-eighth embodiment, wherein the substrate is a component of an absorbent article.

In a sixtieth embodiment, the present disclosure provides the method of the fifty-ninth embodiment, wherein the component is a fastening tab or a diaper ear.

In a sixty-first embodiment, the present disclosure provides a method of making a fastening tab, the method comprising:

stretching a thermoplastic film having a first surface bearing a plurality of male fastening elements and a second surface to form a thermoplastic layer that is plastically deformed; and laminating the second surface of the thermoplastic layer to a substrate to make the fastening tab.

In a sixty-second embodiment, the present disclosure provides the method of the sixty-first embodiment, wherein a distance between opposing first and second side edges of the thermoplastic film is at least ten millimeters.

In a sixty-third embodiment, the present disclosure provides the method of the sixty-first or sixty-second embodiment, wherein the thermoplastic layer at least one of has no through-holes or is substantially planar.

In a sixty-fourth embodiment, the present disclosure provides the method of any one of the sixty-first to fifty-sixty-third embodiments, further comprising unwinding a thermoplastic film from a roll before stretching the thermoplastic film.

In a sixty-fifth embodiment, the present disclosure provides the method of any one of the sixty-first to sixty-fourth embodiments, wherein the thermoplastic film comprises at least one of a polyolefin, polyamide, or polyester.

In a sixty-sixth embodiment, the present disclosure provides the method of the sixty-fifth embodiment, wherein the thermoplastic film comprises at least one of polypropylene or polyethylene.

In a sixty-seventh embodiment, the present disclosure provides the method of the sixty-sixth embodiment, wherein the thermoplastic film comprises beta-phase polypropylene.

In a sixty-eighth embodiment, the present disclosure provides the method of any one of the sixty-first to sixty-seventh embodiments, wherein the second surface of the thermoplastic film is free of male fastening elements.

In a sixty-ninth embodiment, the present disclosure provides the method of any one of the sixty-first to sixty-eighth embodiments, wherein there are multiple rows of the male fastening elements between opposing first and second side edges of the thermoplastic layer.

In a seventieth embodiment, the present disclosure provides the method of any one of the sixty-first to sixty-ninth embodiments, wherein the thermoplastic film is stretched monoaxially in the machine direction.

In a seventy-first embodiment, the present disclosure provides the method of the seventieth embodiment, wherein the thermoplastic film is stretched in the machine direction by differential speed rolls.

In a seventy-second embodiment, the present disclosure provides the method of any one of the sixty-first to sixty-ninth embodiments, wherein the thermoplastic film is stretched in both the machine direction and cross-direction.

In a seventy-third embodiment, the present disclosure provides the method of any one of the sixty-first to seventy-second embodiments, wherein stretching the thermoplastic film so that it plastically deforms comprises stretching to at least 20% elongation.

In a seventy-fourth embodiment, the present disclosure provides the method of any one of the sixty-first to seventy-third embodiments, wherein stretching the thermoplastic film so that it plastically deforms comprises stretching to at least 25% elongation.

In a seventy-fifth embodiment, the present disclosure provides the method of any one of the sixty-first to seventy-fourth embodiments, wherein stretching the thermoplastic film so that it plastically deforms comprises stretching to at least 30% elongation.

In a seventy-sixth embodiment, the present disclosure provides the method of any one of the sixty-first to seventy-fifth embodiments, wherein stretching the thermoplastic film so that it plastically deforms comprises stretching to at least 50% elongation.

In a seventy-seventh embodiment, the present disclosure provides the method of any one of the sixty-first to seventy-sixth embodiments, wherein the thermoplastic layer is stretched by 1.25× to 5× in at least one direction.

In a seventy-eighth embodiment, the present disclosure provides the method of any one of the sixty-first to seventy-seventh embodiments, wherein the thermoplastic layer is stretched by 1.5× to 4× in at least one direction.

In a seventy-ninth embodiment, the present disclosure provides the method of any one of the sixty-first to seventy-eighth embodiments, wherein a density of the male fastening elements before stretching is in a range from $394/cm^2$ ($2500/in^2$) to $1575/cm^2$ ($10000/in^2$).

In an eightieth embodiment, the present disclosure provides the method of any one of the sixty-first to seventy-ninth embodiments, wherein a density of the male fastening elements after stretching is in a range from $248/cm^2$ ($1600/in^2$) to $550/cm^2$ ($3500/in^2$).

In an eighty-first embodiment, the present disclosure provides the method of any one of the sixty-first to eightieth embodiments, wherein stretching the thermoplastic film comprises adjusting a density of the male fastening elements to achieve a pre-determined density.

In an eighty-second embodiment, the present disclosure provides the method of the eighty-first embodiment, wherein the pre-determined density is selected based on a desired shear or peel strength to a fibrous substrate.

In an eighty-third embodiment, the present disclosure provides the method of any one of the sixty-first to eighty-second embodiments, wherein after stretching, the thermoplastic layer has an average thickness of up to 75 micrometers.

In an eighty-fourth embodiment, the present disclosure provides the method of the eighty-third embodiment, wherein after stretching, the average thickness of the thermoplastic layer is up to 50 micrometers.

In an eighty-fifth embodiment, the present disclosure provides the method of any one of the sixty-first to eighty-fourth embodiments, further comprising providing a wide thermoplastic web having a first surface bearing a plurality of the male fastening elements, the wide thermoplastic web having a width at least twice the distance between the opposing first and second side edges of the thermoplastic film, the method further comprising slitting the wide thermoplastic web to form at least two of the thermoplastic films.

In an eighty-sixth embodiment, the present disclosure provides the method of the eighty-fifth embodiment, wherein the at least two of the thermoplastic films are stretched simultaneously.

In an eighty-seventh embodiment, the present disclosure provides the method of the eighty-fifth or eighty-sixth embodiment, wherein the at least two of the thermoplastic films remain connected to the wide thermoplastic web during at least a portion of the stretching.

In an eighty-eighth embodiment, the present disclosure provides the method of any one of the eighty-fifth to eighty-seventh embodiments, wherein slitting the wide thermoplastic web and stretching the at least two of the thermoplastic films is carried out in-line.

In an eighty-ninth embodiment, the present disclosure provides the method of any one of the sixty-first to eighty-eighth embodiments, further comprising heating the thermoplastic film before stretching, while stretching, or a combination thereof.

In a ninetieth embodiment, the present disclosure provides the method of any one of the sixty-first to eighty-ninth embodiments, further comprising relaxing the thermoplastic layer that is plastically deformed to reduce its tensile strain.

In a ninety-first embodiment, the present disclosure provides the method of any one of the ninetieth embodiment, wherein stretching, relaxing, and laminating are carried out in-line.

In a ninety-second embodiment, the present disclosure provides the method of the ninety-first or ninetieth embodiments, wherein stretching the thermoplastic film so that it plastically deforms comprises stretching the thermoplastic film more than a desired tensile strain, and wherein relaxing the stretched thermoplastic layer to reduce its tensile strain comprises relaxing the stretched thermoplastic layer to the desired tensile strain.

In a ninety-third embodiment, the present disclosure provides the method of any one of the ninetieth to ninety-second embodiments, wherein stretching the thermoplastic film so that it plastically deforms comprises stretching the thermoplastic layer at least 20% more than a desired tensile, and wherein relaxing the stretched thermoplastic layer to reduce its tensile strain comprises relaxing the stretched thermoplastic layer to the desired tensile strain.

In a ninety-fourth embodiment, the present disclosure provides the method of any one of the ninetieth to ninety-third embodiments, wherein stretching the thermoplastic film so that it plastically deforms comprises stretching the thermoplastic layer at least 50% more than a desired tensile strain, and wherein relaxing the stretched thermoplastic layer to reduce its tensile strain comprises relaxing the stretched thermoplastic layer to the desired tensile strain.

In a ninety-fifth embodiment, the present disclosure provides the method of any one of the ninetieth to ninety-fourth embodiments, wherein stretching and relaxing are carried out multiple times before laminating the second surface of the thermoplastic layer to a substrate.

In a ninety-sixth embodiment, the present disclosure provides the method of any one of the ninetieth to ninety-fifth embodiments, wherein the thermoplastic layer is laminated to the substrate by adhesive bonding, thermal bonding, point bonding, ultrasonic welding, laser welding, or combinations thereof.

In a ninety-seventh embodiment, the present disclosure provides the method of any one of the ninetieth to ninety-sixth embodiments, wherein when two lines with identical end point positions are projected onto the laminate with the lines running parallel to the sample, with one of the two lines positioned on the laminate over the thermoplastic layer and another of the two lines positioned 0.635 centimeter beyond the edge of the thermoplastic layer on the substrate, and a path length of each of the two lines is measured, a difference between the path lengths is less than 2%.

In a ninety-eighth embodiment, the present disclosure provides the method of any one of the sixty-first to ninety-seventy embodiment, wherein the substrate is a component of an absorbent article.

In a ninety-ninth embodiment, the present disclosure provides the method of the ninety-eighth embodiment, wherein the component is a fastening tab or a diaper ear.

In order that this disclosure can be more fully understood, the following examples are set forth. It should be understood that these examples are for illustrative purposes only and are not to be construed as limiting this disclosure in any manner.

EXAMPLES

Materials

Film grade polypropylene (PP) copolymer, a polypropylene impact copolymer, was obtained from the Dow Chemical Company, Midland, Mich., under the trade designation "DOW C700-35N POLYPROPYLENE RESIN". The polymer density was reported to be 0.902 g/cc as measured according to ASTM D972 and the melt flow index (MFI) was reported to be 35 (at 230° C. and under the load of 2.16 kg) as measured according to ASTM D1238.

Sample Preparation

A substantially continuous thermoplastic layer was prepared with an array of upstanding posts integral with the thermoplastic layer. The upstanding posts were capped. The cap shapes were oval, and after they were made, they were deformed using the procedure described in U.S. Pat. No. 6,132,660 (Kampfer) to provide "hook heads with downwardly projecting fiber engaging portions".

Example 1 and Illustrative Example 1

A thermoplastic layer with male fastening elements was prepared by feeding a stream of C700-35N Polyproplyene Resin through a 2 inch single screw extruder. Barrel zones 1-7 were set at 176° C., 170° C., 180° C., 190° C., 200° C., 218° C., and 218° C., respectively. The molten resin was then fed through a sheet die to a rotating cylindrical mold. The temperature of the die was set at 218° C. and the temperature of cylindrical mold was set at 90° C. The screw speed was set at 80 rpm. Rapid flow of the resin into the mold cavities induced molecular orientation parallel to the direction of flow. The mold was water-cooled to provide rapid quenching that maintained the orientation in the polymer. The post density was 3500 posts per square inch (542 posts per square centimeter) arranged in a staggered array and the post shape was conical. The web was fed directly into a cap forming apparatus. The posts were capped with oval shaped caps using the procedure described in U.S. Pat. No. 5,845,375 (Miller et al.). The caps were subsequently deformed using the procedure described in U.S. Pat. No. 6,132,660 (Kampfer). The web was 140 mm wide.

For Illustrative Example 1, the thermoplastic layer with male fastening elements was stretched in the machine direction using a draw ratio of 3:1 by passing the sample through a pair of rolls arranged with one roll on top of the other roll. The top roll was a rubber-coated roll at room temperature. The bottom roll was a metal roll that was heated at 70° C. The web was S-wrapped around the two rolls, with the male fastening elements positioned toward the rubber-coated roll and away from the metal roll. The gap between the rubber roll and the metal roll was 6 inches (15.2 cm). The final width of the web was 102 mm. The web was then slit into 15-mm wide strips. A portion of a strip that did not include the edge of the 102-mm web was analyzed as described below.

For Example 1, the thermoplastic layer with male fastening elements was slit into 15-mm wide strips. A 15-mm wide strip was stretched in the machine direction using the method described above for Illustrative Example 1. The final width of the strip was 9 mm. The strip was then analyzed as described, below.

Retardance was measured continuously along a line in the cross-machine direction starting at the sample edge to 500 microns inside the edge giving a retardance profile along the path length. The measurements were made using a polarization microscope such as a "LEICA DMRXE", type TCS, obtained from Microsystems GmbH, Wetzlar, Germany, equipped with an LC-Polscope system from CRi Inc., now part of PerkinElmer Inc., Waltham, Mass., using a Q Imaging Retiga Exi FAST1394 camera. Software version 4.7 was used.

The average retardance from the edge to 500 microns inside the edge was calculated. Six replicates were measured, and the average and standard deviation is of these six measurements are recorded in Table 1, below. The six measurements were made at three locations on each edge of the sample. Next, the distance from the edge of the sample where the retardance reached 75% of the average from 0 to 500 microns was measured. The average and standard deviation of this distance is recorded in Table 1, below.

TABLE 1

| Sample | Average retardance (nm) from 0 to 500 microns from the edge of the sample | | Distance from edge (microns) to reach 75% of the average retardance | |
|---|---|---|---|---|
| | mean | Standard deviation | Mean | Standard deviation |
| Example 1 | 36.8 | 3.525 | 24.275 | 5.175 |
| Illustrative Ex. 1 | 28.275 | 4.6 | 8.2 | 3.4 |

Examples 2 to 7

The thermoplastic layer with male fastening elements was prepared by feeding a stream of C700-35N Polyproplyene Resin through a 2 inch single screw extruder. Barrel zones 1-7 were set at 176° C., 170° C., 180° C., 190° C., 200° C., 218° C., and 218° C., respectively. The molten resin was then fed through a sheet die to a rotating cylindrical mold. The temperature of the die was set at 218° C. and the temperature of cylindrical mold was set at 90° C. The screw speed was set at 80 rpm. Rapid flow of the resin into the mold cavities induced molecular orientation parallel to the direction of flow. The mold was water-cooled to provide rapid quenching that maintained the orientation in the polymer. The post density was 3500 posts per square inch (542 posts per square centimeter) arranged in a staggered array and the post shape was conical. The web was fed directly into a cap forming apparatus. The posts were capped with oval shaped caps using the procedure described in U.S. Pat. No. 5,845,375 (Miller et al.). The caps were subsequently deformed using the procedure described in U.S. Pat. No. 6,132,660 (Kampfer). The thermoplastic layer was then slit to a width of 30 millimeters (mm).

The 30-mm wide thermoplastic layer with male fastening elements was stretched in the machine direction using a draw ratio shown in Table 1, below, by passing the sample through a series of rolls. Roll 1 was a rubber-coated nip roll at room temperature, and Roll 2 was a smooth chrome roll heated at 170° F. (76.7° C.) with diameter of 10 inches (25.4 cm). The thermoplastic layer was positioned so that the male fastening elements were away from the metal roll. While still in-line, the thermoplastic layer with male fastening elements was then relaxed and laminated to the adhesive-coated side of a nonwoven adhesive tape obtained from 3M Company, St. Paul, Minn., under the trade designation "CFT-3003" at Roll 3. The thermoplastic layer was S-wrapped around Roll 2 and Roll 3 and at Roll 3 was positioned with the male fastening elements toward Roll 3. Roll 3 was a rubber-coated nip roll at room temperature. The thermoplastic layer and the "CFT-3003" adhesive tape were laminated in the nip. The tension in the tape was 5 Newtons.

For each of Examples 2 to 7, the speed of Roll 3 was twice that of Roll 1, resulting in a final draw ratio of 2:1. The speed of Roll 2 relative to Roll 3 and the resulting draw ratio provided by Roll 2 before relaxation are shown in Table 2, below. The final lamination line speed was 5 meters per minute.

The laminates of Examples 2 to 7 were evaluated for curl using the following test method. An 8- to 12-inch (20- to 30.5-cm) sample of each laminate was cut from the example roll and placed on a table. Each cut end was secured to the table with tape. Each sample was then scanned using a FARO Platinum Arm SN PO4-05-06-05162 with a FARO Laser Scanarm mounted on the arm SN LLP001305486. Each scan was imported into a CAD software. The software used was Geomagic Design Direct 2014 to convert the point cloud to a stl file and import it in to CAD software to create a 3D surface profile of the sample. Referring again to FIG. 7, two straight lines with identical length were projected onto the sample 700 with the lines running parallel to the sample. One line 715 was over a portion of the laminate where the thermoplastic layer 705 and the nonwoven substrate 704 overlap. The other line 717 was 0.25 inches (0.635 cm) outside the edge of the thermoplastic layer, where some wrinkles were visible for some of the samples. Next, the total path lengths of both lines were measured, and the difference between the two path lengths were recorded in Table 2, below.

TABLE 2

| Example | Roll 2 Speed Relative to Roll 3 | Draw ratio at Roll 2 | Length 715, in. (cm) | Length 717, in. (cm) | $\frac{\text{Length 717} - \text{Length 715}}{\text{Length 715}}$ |
|---|---|---|---|---|---|
| 2 | 1.02 | 2.04 | 8.0615 | 8.4952 | 5.38% |
| 3 | 1.1 | 2.20 | 7.0329 | 7.1164 | 1.19% |
| 4 | 1.15 | 2.30 | 7.0375 | 7.1141 | 1.09% |
| 5 | 1.2 | 2.40 | 7.0207 | 7.0724 | 0.74% |

TABLE 2-continued

| Example | Roll 2 Speed Relative to Roll 3 | Draw ratio at Roll 2 | Length 715, in. (cm) | Length 717, in. (cm) | $\dfrac{\text{Length 717} - \text{Length 715}}{\text{Length 715}}$ |
|---|---|---|---|---|---|
| 6 | 1.25 | 2.50 | 6.51667 | 6.5527 | 0.55% |
| 7 | 1.275 | 2.55 | 16.017 | 16.0887 | 0.45% |

Examples 8 to 13

Examples 8 to 13 were carried out using the procedure described for Examples 2 to 7, with the modification that the tension in the tape was 100 Newtons. Samples of each of Examples 8 to 13 were evaluated for curl using the method described in Examples 2 to 7. The results are shown in Table 3, below.

TABLE 3

| Example | Roll 2 Speed Relative to Roll 3 | Draw ratio at Roll 2 | Length 715, in. (cm) | Length 717, in. (cm) | $\dfrac{\text{Length 715} - \text{Length 717}}{\text{Length 715}}$ |
|---|---|---|---|---|---|
| 8 | 1.02 | 2.04 | 8.0419 | 8.3126 | 3.37% |
| 9 | 1.1 | 2.20 | 7.0145 | 7.1219 | 1.53% |
| 10 | 1.15 | 2.30 | 7.5307 | 7.6167 | 1.14% |
| 11 | 1.2 | 2.40 | 7.5179 | 7.5605 | 0.57% |
| 12 | 1.25 | 2.50 | 7.5362 | 7.5657 | 0.39% |
| 13 | 1.275 | 2.55 | 7.5232 | 7.5682 | 0.60% |

This disclosure is not limited to the above-described embodiments but is to be controlled by the limitations set forth in the following claims and any equivalents thereof. This disclosure may be suitably practiced in the absence of any element not specifically disclosed herein.

What is claimed is:

1. An article comprising:
a thermoplastic layer having opposing first and second side edges and first and second surfaces, the first surface of the thermoplastic layer bearing a plurality of male fastening elements, wherein the thermoplastic layer is plastically deformed and has a retardance profile comprising an average retardance along a line from the first side edge to a location 500 micrometers from the first side edge, wherein a distance from the first side edge where 75% of the average retardance is observed is at least 10 micrometers, and wherein a distance between the opposing first and second side edges is up to 50 millimeters.

2. An article comprising:
a substrate; and
a thermoplastic layer joined to the substrate,
the thermoplastic layer having opposing first and second side edges and first and second surfaces, the first surface of the thermoplastic layer bearing a plurality of male fastening elements, wherein the thermoplastic layer is plastically deformed and has a retardance profile comprising an average retardance along a line from the first side edge to a location 500 micrometers from the first side edge, wherein a distance from the first side edge where 75% of the average retardance is observed is at least 10 micrometers,
wherein the article is a fastening tab.

3. The article of claim 1, wherein the distance between the opposing first and second side edges is at least ten millimeters.

4. The article of claim 1, wherein the second surface of the thermoplastic layer is free of male fastening elements.

5. The article of claim 1, wherein there are multiple rows of the male fastening elements between the opposing first and second side edges of the thermoplastic layer.

6. An absorbent article comprising the article of claim 1.

7. The article of claim 2, wherein the distance between the opposing first and second side edges is at least ten millimeters.

8. The article of claim 2, wherein the second surface of the thermoplastic layer is free of male fastening elements.

9. The article of claim 2, wherein there are multiple rows of the male fastening elements between the opposing first and second side edges of the thermoplastic layer.

10. An absorbent article comprising the article of claim 2.

11. A method of making the article of claim 1, the method comprising: providing a thermoplastic film having the first surface bearing the plurality of male fastening elements and said opposing first and second side edges with the distance thermoplastic film, wherein stretching plastically deforms the thermoplastic film to form the thermoplastic layer.

12. The method of claim 11, wherein the thermoplastic film is stretched in the machine direction.

13. The method of claim 11, wherein stretching the thermoplastic film comprises adjusting a density of the male fastening elements to achieve a pre-determined density.

14. The method of claim 11, wherein providing the thermoplastic film comprises providing a wide thermoplastic web having a first surface bearing a plurality of the male fastening elements, the wide thermoplastic web having a width at least twice the distance between the opposing first and second side edges of the thermoplastic film, the method further comprising slitting the wide thermoplastic web to form at least two of the thermoplastic films.

15. The method of claim 11, wherein the at least two of the thermoplastic films are stretched simultaneously.

16. The method of claim 11, wherein the at least two of the thermoplastic films remain connected to the wide thermoplastic web during at least a portion of the stretching.

17. The method of claim 11, wherein providing the thermoplastic film comprises unwinding the thermoplastic film from a roll.

18. The method of claim 11, further comprising laminating a second surface of the thermoplastic film to a substrate, wherein the second surface is opposite the first surface.

19. The method of claim 18, wherein the substrate is a component of an absorbent article.

20. The method of claim 11, wherein a second surface of the thermoplastic film, opposite the first surface, is free of male fastening elements.

* * * * *

UNITED STATES PATENT AND TRADEMARK OFFICE
CERTIFICATE OF CORRECTION

PATENT NO. : 10,967,624 B2
APPLICATION NO. : 16/064085
DATED : April 6, 2021
INVENTOR(S) : Tom Gilbert et al.

Page 1 of 1

It is certified that error appears in the above-identified patent and that said Letters Patent is hereby corrected as shown below:

In the Claims

Column 36
Line 41, Claim 11, after "distance", insert -- between the opposing first and second side edges of up to 50 millimeters; and stretching the --.
Line 57, Claim 15, delete "claim 11," and insert -- claim 14, --, therefor.
Line 59, Claim 16, delete "claim 11," and insert -- claim 14, --, therefor.

Signed and Sealed this
Twenty-second Day of November, 2022

Katherine Kelly Vidal
*Director of the United States Patent and Trademark Office*